(12) United States Patent
Yamashita et al.

(10) Patent No.: US 7,008,721 B2
(45) Date of Patent: Mar. 7, 2006

(54) BATTERY AND LEAD-INSULATING FILM

(75) Inventors: Rikiya Yamashita, Shinjuku-ku (JP);
Kazuki Yamada, Shinjuku-ku (JP);
Masataka Okushita, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 65 days.

(21) Appl. No.: 10/204,553

(22) PCT Filed: Jan. 18, 2002

(86) PCT No.: PCT/JP02/00346

§ 371 (c)(1),
(2), (4) Date: Aug. 22, 2002

(87) PCT Pub. No.: WO02/058170

PCT Pub. Date: Jul. 25, 2002

(65) Prior Publication Data
US 2003/0054241 A1    Mar. 20, 2003

(30) Foreign Application Priority Data
Jan. 18, 2001  (JP)  ................................. 2001-9750
Feb. 20, 2001  (JP)  ................................. 2001-43670

(51) Int. Cl.
*H01M 2/06*  (2006.01)
*H01M 2/08*  (2006.01)
(52) U.S. Cl. ........................... 429/184; 429/1; 429/65; 429/127; 429/185
(58) Field of Classification Search ................ 429/1, 429/65, 127, 162, 181, 184, 185
See application file for complete search history.

(56) References Cited

U.S. PATENT DOCUMENTS 6,395,420 B1 * 5/2002 Komatsu .................... 429/164
6,475,668 B1 * 11/2002 Hosokawa et al. ......... 429/163
6,689,177 B1 * 2/2004 Sugiyama et al. ......... 29/623.2

FOREIGN PATENT DOCUMENTS

| JP | 11-233133 | 8/1999 |
|---|---|---|
| JP | 2000-208112 | 7/2000 |
| JP | 2000-268789 | 9/2000 |
| JP | 2000-294286 | 10/2000 |
| JP | 2000-340187 | 12/2000 |
| JP | 2002151023 A * | 5/2002 |

* cited by examiner

*Primary Examiner*—Tracy Dove
(74) *Attorney, Agent, or Firm*—Oliff & Berridge, PLC

(57) ABSTRACT

A lithium battery (1) has a battery module (2), a battery package (5) for holding the battery module (2) therein, and leads (4) extending from the battery module (2) and projecting outside from the battery package (5). The battery package (5) is formed from a laminated sheet (10), and a peripheral part (9) of the battery package (5) is heat-sealed. Lead-insulating films (6) are interposed between the peripheral part (9) of the package (5) and the leads (4). Each of the lead-insulating films includes a heat-resistant base film (22), a polyolefin resin layer (21) formed on one of the surfaces of the base film (22) on the side of the laminated sheet (10), and an acid-modified polyolefin resin layer (23) formed on the other surface of the base film (22) on the side of the lead (4).

7 Claims, 10 Drawing Sheets

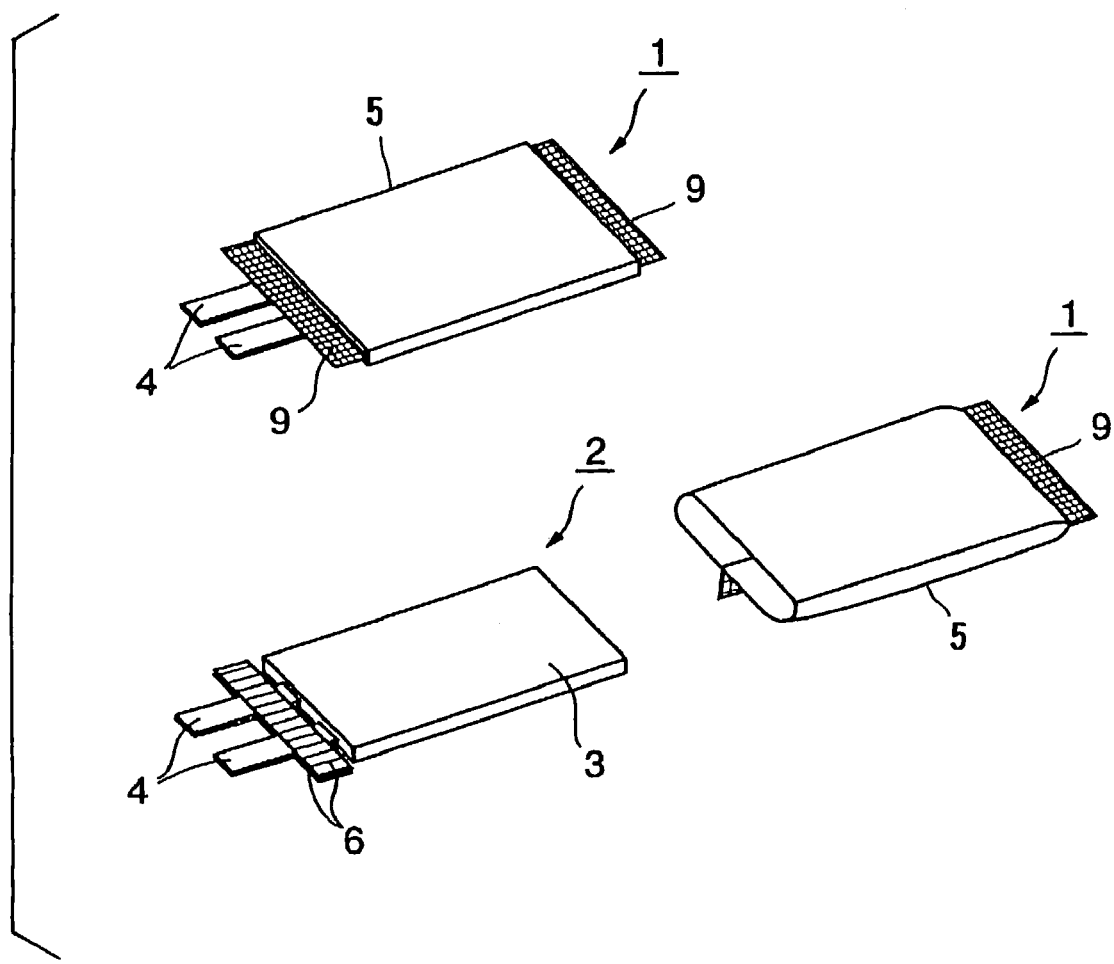
F I G. 4

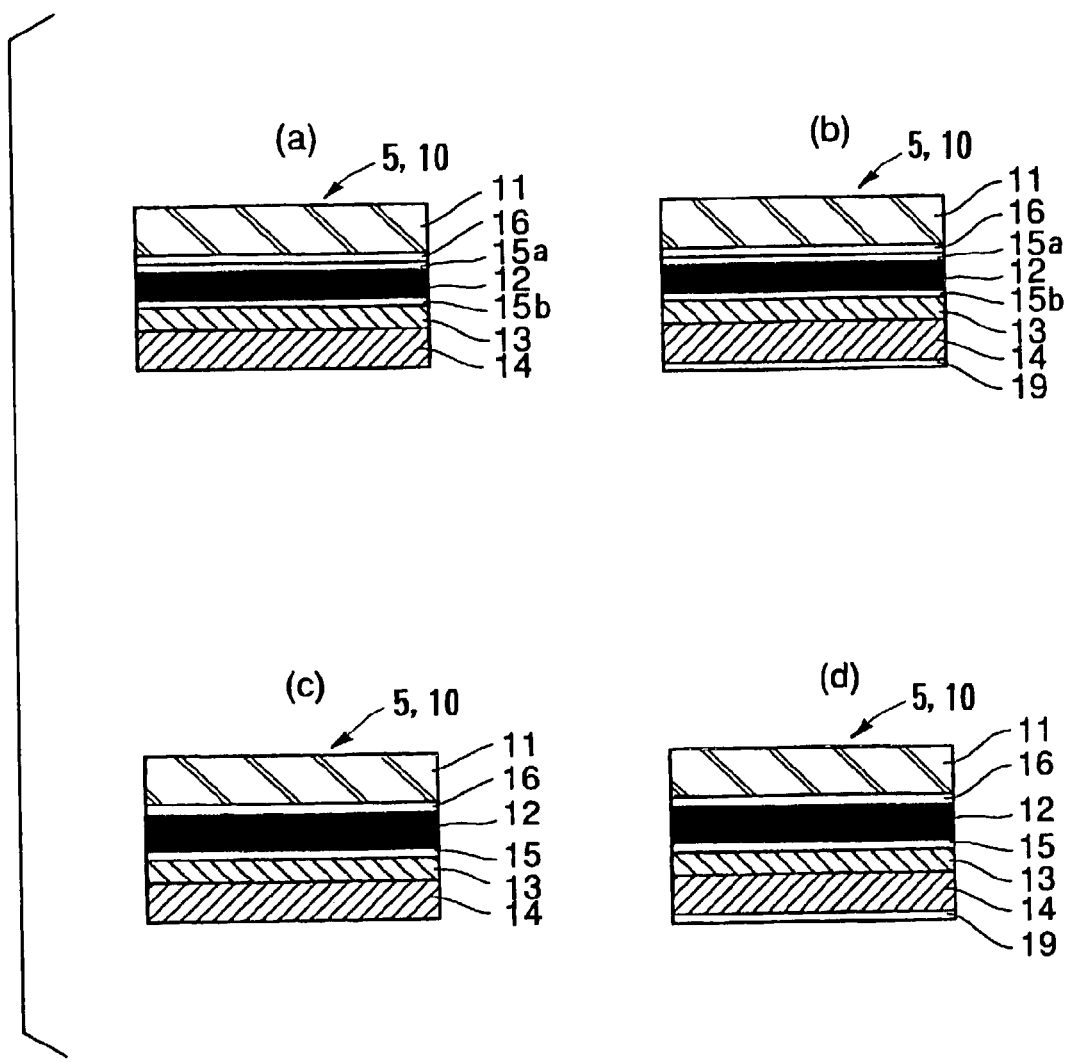
F I G. 7

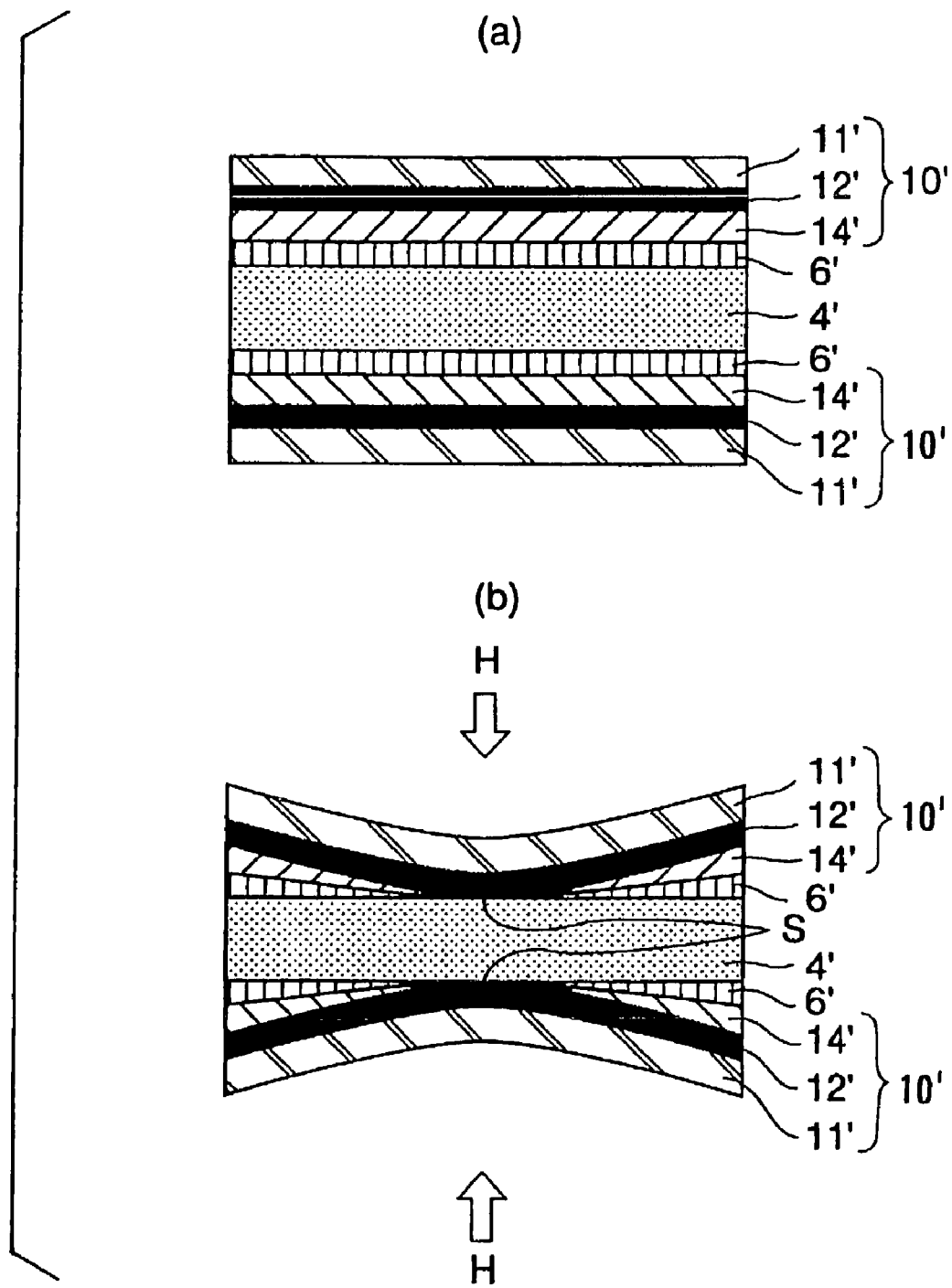
F I G. 9

BATTERY AND LEAD-INSULATING FILM

TECHNICAL FIELD

The present invention relates to a battery, such as a lithium battery, and a lead-insulating film for the battery.

BACKGROUND ART

A lithium battery, which also called a lithium secondary battery, uses a solid polymer electrolyte, a gel polymer electrolyte or a liquid electrolyte, and generates a current by the migration of lithium ions. Active substances forming the positive and the negative electrode contain a polymer. A lithium-ion battery as a representative battery will be described.

A lithium secondary battery includes a positive electrode (aluminum or nickel), a positive electrode active layer (a metal oxide, carbon black, a metal sulfide, an electrolyte or a positive electrode polymer, such as polyacrylonitrile, electrolyte), electrolyte layers (a carbonate electrolyte, such as propylene carbonate, ethylene carbonate, dimethy carbonate or ethylene-methyl carbonate, an inorganic solid electrolyte, such as a lithium salt, or a gel electrolyte), a negative electrode active substance (lithium, an alloy, carbon, an electrolyte, a negative electrode polymer, such as polyacrylonitrile), a negative electrode (copper, nickel, a stainless steel), and a package containing those components.

Lithium batteries are used on personal computers, portable remote terminals, such as portable telephones, PDAs and the liken, video cameras, electric vehicles, energy storage batteries, robots, artificial satellites and the like.

The package of the lithium battery is a cylindrical or parallelepipedic metal can formed by press-working a metal blank or a pouch formed by processing a laminate structure, such as a composite film formed by laminating a film and a metal foil.

Such packages for lithium batteries have the following problems. The metal can is relatively hard and hence the shape of the battery is dependent on that of the metal can. Consequently, an external structure that uses the battery needs to be designed so as to conform to the shape of the battery, the dimensions of the external structure are dependent on the battery, and free choices in designing the external structure are reduced.

Therefore, there is a tendency to use pouches as packages. The package is formed from a laminated sheet having, in view of physical properties required of the lithium battery, workability and economical requirements, at least a base layer, a barrier layer, heat-sealable layer, and bonding resin layers for bonding together the adjacent layers. When necessary, the laminated sheet further has an intermediate layer.

Such a package for a lithium battery is a pouch formed from such a laminated sheet or an embossed package having a battery holding part formed by press-working a laminated sheet. A lithium battery module is put in the package, and peripheral parts of the package are heat-sealed hermetically to complete a lithium battery.

A part of the heat-sealable layer must be capable of being bonded to another part of the same by heat-sealing and of being bonded to metal leads extending from the battery module. Therefore, an acid-modified polyolefin resin adhesive to metal members is used for forming the heat-sealable layer.

The workability of an acid-modified polyolefin resin, as compared with that of general polyolefin resins, is low and an acid-modified polyolefin resin is expensive for forming the heat-sealable layer of the package. Therefore, a method uses a general polyolefin resin layer as a heat-sealable layer for a package, and places a lead-insulating film capable of being bonded to both the heat-sealable layer and a lead between the heat-sealable layer and the lead.

Possible lead-insulating films are those of unsaturated carboxylic acid graft polyolefin resins, metal-crosslinked polyethylene resins, and copolymers of ethylene or propylene, and acrylic acid or methacrylic acid.

When the heat-sealable layer of the laminated sheet forming a package for a lithium battery is formed of a polyethylene resin, the following problems arises when a lithium battery module is put in the package, lead-insulating films are interposed between leads and the package, and a peripheral part of the package is sealed hermetically. If the lead-insulating film is, for example, a single-layer film of an acid-modified polyethylene resin, parts of the heat-sealable layer and parts of the lead-insulating films corresponding to the leads melt when heat and pressure are applied thereto for heat-sealing and, sometimes, parts of the heat-sealable layer and the lead-insulating films are extruded outside pressed regions. Consequently, an aluminum foil serving as the barrier layer of the package comes into contact with the metal leads to short-circuit the lithium battery module.

Similarly, when the heat-sealable layer of the laminated sheet forming the package is formed of a polypropylene resin, it occurs sometimes that an aluminum foil serving as the barrier layer of the package comes into contact with the metal leads to short-circuit the lithium battery module even if single-layer lead-insulating films of an acid-modified polypropylene resin are employed.

DISCLOSURE OF THE INVENTION

The present invention has been made in view of the foregoing problems and it is therefore an object of the present invention to provide battery including a battery module, and a package containing the battery module, capable of stably sealing the battery module therein without short-circuiting leads included in the battery module by a barrier layer included therein when the battery module is put in the package, and heat and pressure are applied to a peripheral part of the package to heat-seal the package.

According to the present invention, a battery includes: a battery module; a battery package for holding the battery module therein; and leads extending from the battery module and projecting outside from the battery package; wherein the battery package is formed from a laminated sheet, a peripheral part of the package is heat-sealed, and lead-insulating films are interposed between the peripheral part of the package and the leads.

In the battery according to the present invention, each of the lead-insulating films includes a heat-resistant base film, and a pair of resin layers formed on the opposite surfaces of the heat-resistant base film, respectively, by an extrusion lamination process.

In the battery according to the present invention, one resin layer on the side of the laminated sheet of the pair of resin layers is formed of a polyolefin resin, and the other resin layer on the side of the lead is formed of an acid-modified polyolefin resin.

In the battery according to the present invention, the heat-resistant base film is formed of one of polyethylene terephthalate resins, polyethylene naphthalate resins, polyphenylene sulfide resins, polymethyl pentene resins, polyacetal resins, cyclic polyolefin resins and polypropylene resins.

In the battery according to the present invention, the leads have the shape of an elongate plate or a bar, and are formed of a metal.

In the battery according to the present invention, the laminated sheet includes at least a base layer, an aluminum layer and a heat-sealable layer, and the heat-sealable layer is formed of a polyolefin resin.

In the battery according to the present invention, the lead-insulating film is a coextruded film formed by coextrusion and consists of a polyolefin resin layer on the side of the laminated sheet, an acid-modified polyolefin resin layer on the side of the lead, and an adhesive polymethyl pentene resin layer interposed between the polyolefin resin layer and the acid-modified polyolefin resin layer.

In the battery according to the present invention, the polyolefin resin layer of the coextruded film is formed of a polyethylene resin In the battery according to the present invention, the polyolefin resin layer of the coextruded film is formed of a polypropylene resin.

In the battery according to the present invention, the laminated sheet includes, at least a base layer, an aluminum layer and a heat-sealable layer, and the heat-sealable layer is formed of a polyolefin resin.

According to the present invention, a lead-insulating film for bonding a lead extending through and projecting outside from a heat-sealed peripheral part of a battery package formed from a laminated sheet to the battery package includes: a heat-resistant base film, and a pair of resin layers formed on the opposite surfaces of the heat-resistant base film, respectively, by extrusion lamination process.

In the lead-insulating film according to the present invention, one resin layer on the side of the laminated sheet of the pair of resin layers is formed of a polyolefin resin, and the other resin layer on the side of the lead is formed of an acid-modified polyolefin resin.

In the lead-insulating film according to the present invention, the heat-resistant base film is formed of one of polyethylene terephthalate resins, polyethylene naphthalate resins, polyphenylene sulfide resins, polymethyl pentene resins, polyacetal resins, cyclic polyolefin resins and polypropylene resins.

In the lead-insulating film according to the present invention, the leads have the shape of an elongate plate or a bar, and are formed of a metal.

According to the present invention, a lead-insulating film for bonding a lead extending through and projecting outside from a heat-sealed peripheral part of a battery package formed from a laminated sheet to the battery package is a coextruded film consisting of a polyolefin resin layer on the side of the laminated sheet, an acid-modified polyolefin resin film on the side of the lead, and an adhesive polymethyl pentene resin layer interposed between the polyolefin resin layer and the acid-modified polyolefin resin layer.

In the lead-insulating film according to the present invention, the polyolefin resin layer of the coextruded film is formed of a polyethylene resin.

In the lead-insulating film according to the present invention, the polyolefin resin layer of the coextruded film is formed of a polypropylene resin.

BRIEF DESCRIPTION OF THE DRAWINGS

FIG. 4 is a view of assistance in explaining a pouch;

FIG. 7 shows sectional views of laminated sheets for forming packages;

FIG. 9 shows views of assistance in explaining conventional lead-insulating films, and a lead held between the lead-insulating films.

BEST MODE FOR CARRYING OUT THE INVENTION

First Embodiment

The present invention makes a package from a moisture-proof, chemical-resistant lithium battery packaging material having a heat-sealable layer of a polyolefin resin, and capable of being manufactured at high productivity, and packages a lithium battery module in the package. The present invention provides a lead-insulating film capable of surely sealing the joint between the package and a lead extending from the battery module and projecting outside from the package and of preventing contact between the lead and a barrier layer included in the package. The lead-insulating film is a multilayer film consisting of a heat-resistant base film, and polyolefin resin layers formed on the opposite surfaces of the base film, respectively, by an extrusion process.

Polyolefin resins include propylene resins (homopolymers, ethylene-propylene copolymers, ethylene-propylene-butene copolymers), ethylene resins (low-density polyethylene resins, medium-density polyethylene resins, high-density polyethylene resins, linear low-density polyethylene resins, copolymers of ethylene and butene, copolymers of ethylene, and acrylic acid or methacrylic acid derivative, copolymers of ethylene and vinyl acetate, and polyethylene resins containing metal ions), polyethylene resins, graft copolymers each of unsaturated carboxylic acid and a polyethylene or polypropylene monomer, and blends of some of those.

The present invention will be described with reference to the accompanying drawings.

Figure 1:
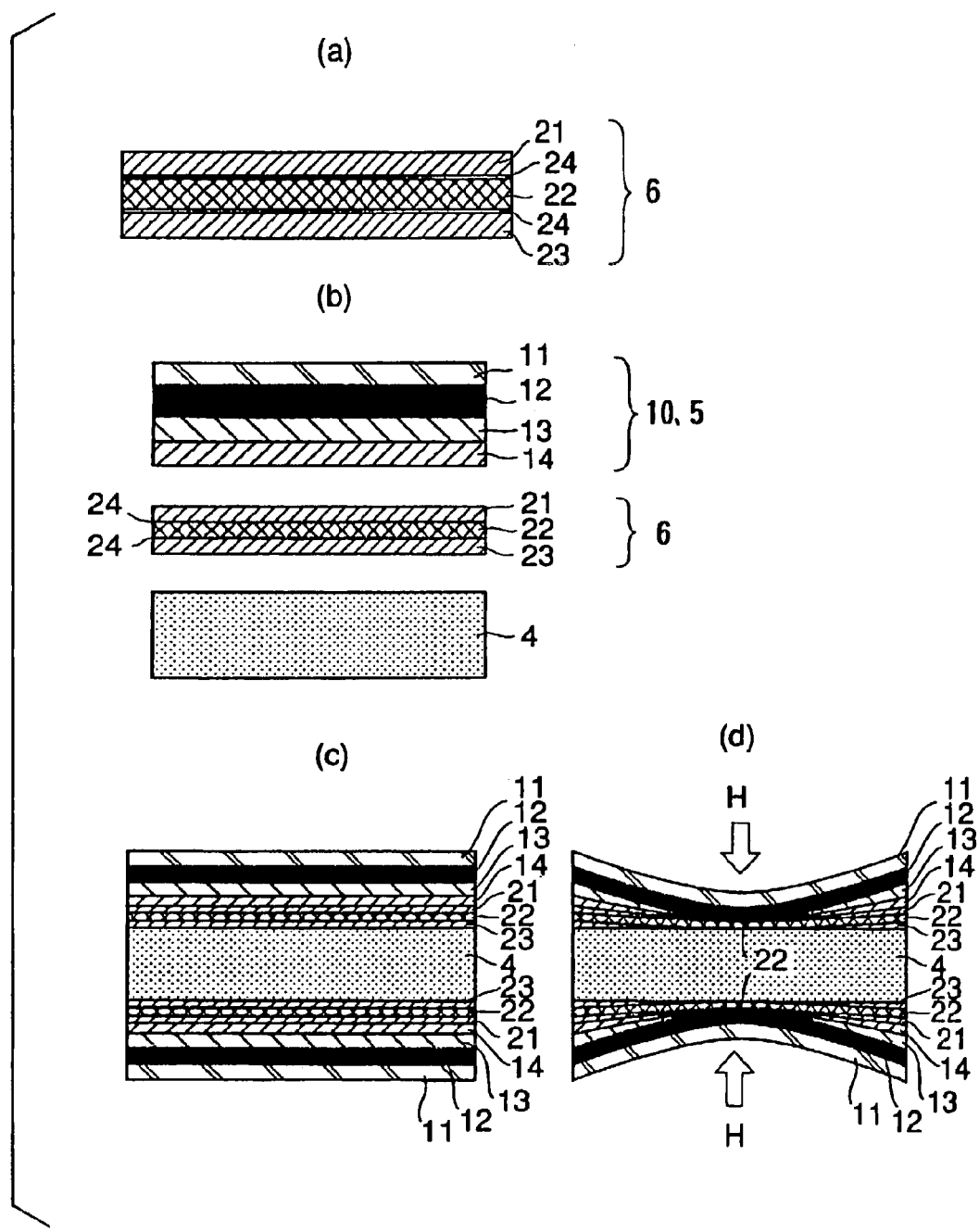
FIG. 1 shows views of assistance in explaining a lead-insulating film in a first embodiment according to the present invention.
Figure 2:
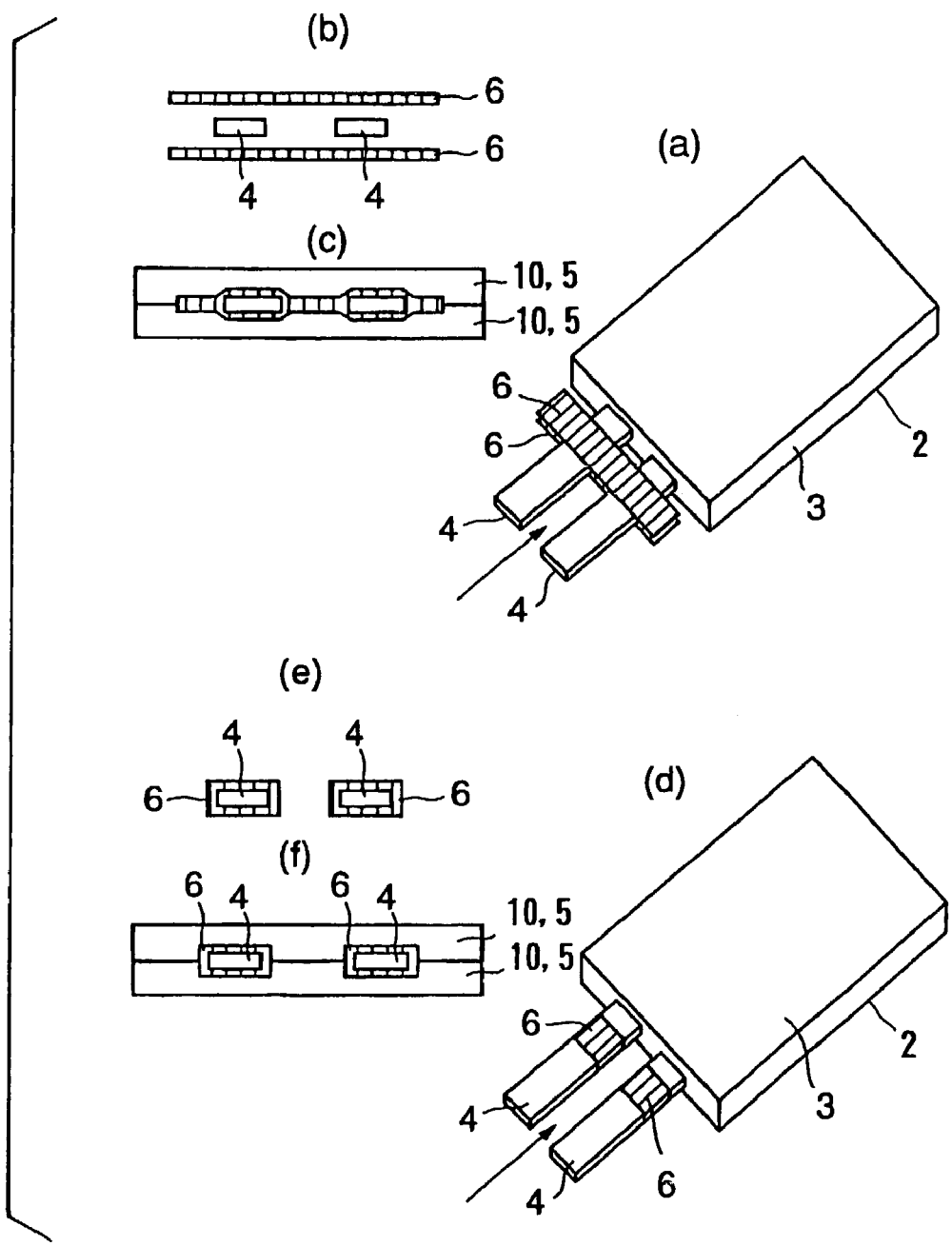
FIG. 2 shows views of assistance in explaining a method of attaching lead-insulating films to leads.

FIG. 1(a) is a view of assistance in explaining a lead-insulating film according to the present invention, FIG. 1(b) is a view of assistance in explaining the positional relation between a lead of a lithium battery, a package and a lead-insulating film, FIG. 1(c) is a sectional view of assistance in explaining a superposed arrangement of a lead, a lead-insulating film and a package in a state before heat-sealing, and FIG. 1(d) is a typical sectional view of a lead and the associated parts in a state after heat-sealing. FIG. 2 shows views of assistance in explaining a method of interposing a lead-insulating film between a lead and a package;

FIG. 4 is a perspective view of assistance in explaining a pouch for a lithium battery.

Figure 5:
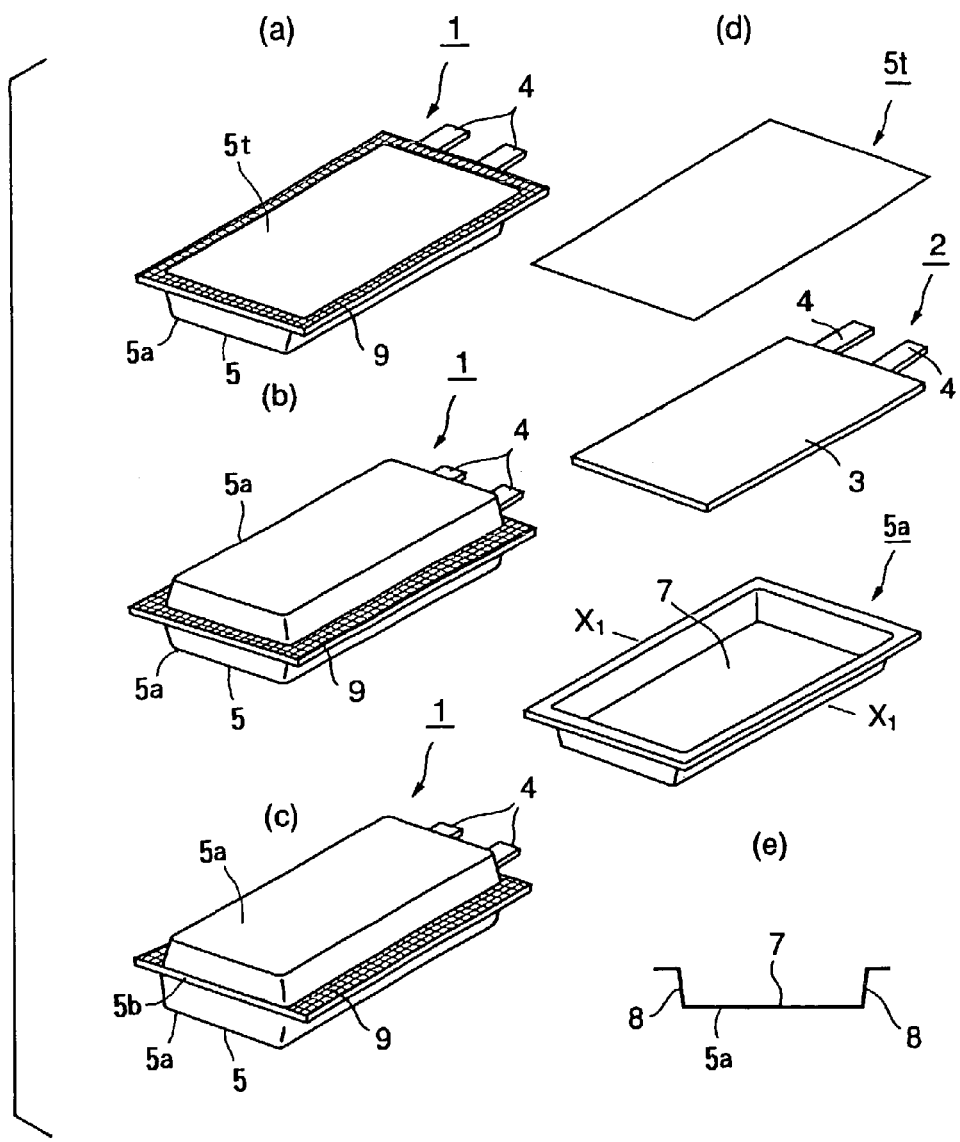
FIG. 5 shows views of assistance in explaining an embossed package.
Figure 8:
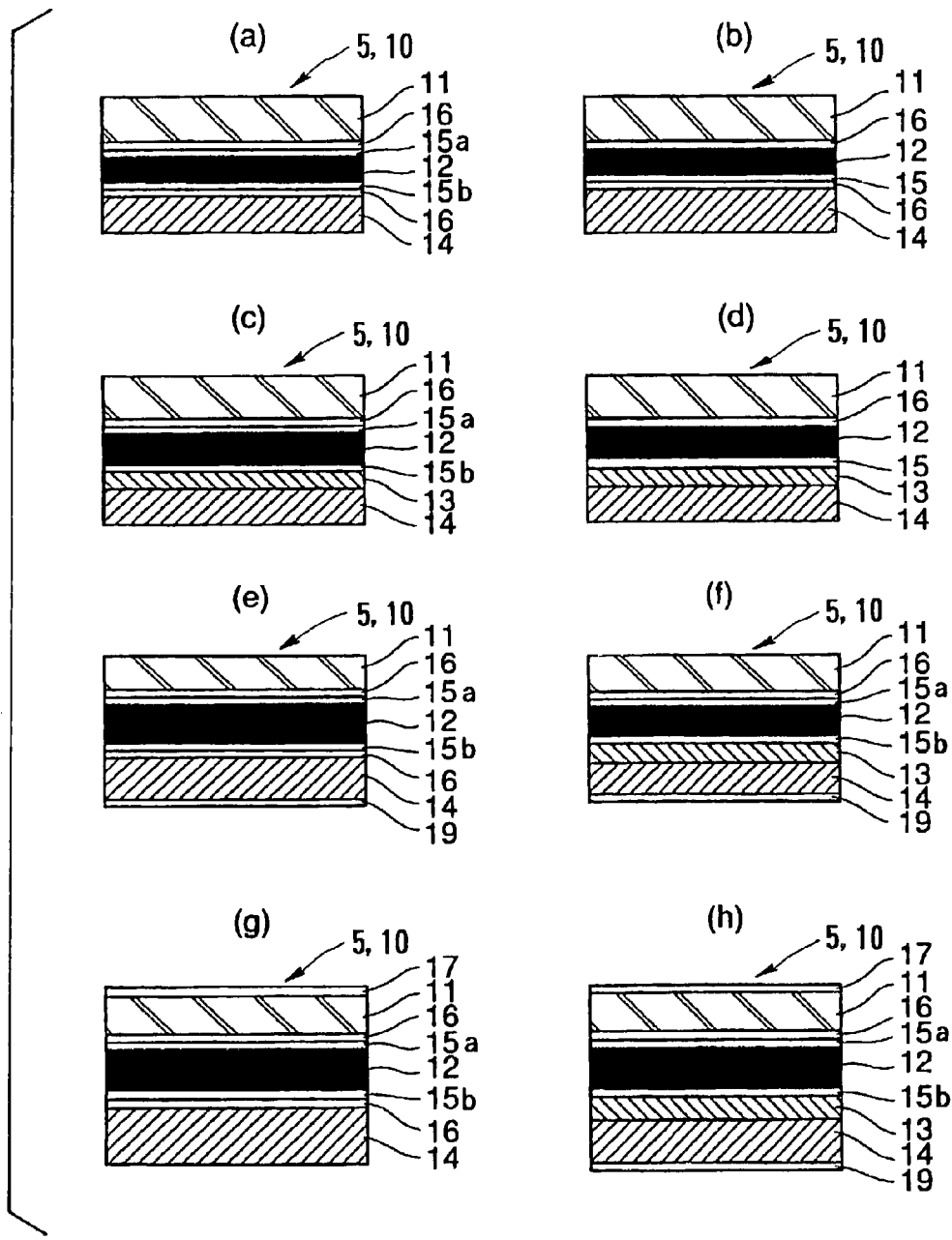
FIG. 8 shows sectional views of laminated sheets for forming packages.

FIG. 5 shows views of assistance in explaining an embossed package for a lithium battery. FIG. 6(a) is a perspective view of assistance in explaining a method of forming an embossed package, FIG. 6(b) is a view of an embossed package, FIG. 6(c) is a sectional view taken on line $X_2$–$X_2$ in FIG. 6(b), and FIG. 6(d) is an enlarged view of a part $Y_1$ in FIG. 6(c). FIG. 7 is a sectional view of a laminated sheet from which a package for a lithium battery is made. FIG. 8 is a sectional view of another laminated sheet from which a package for a lithium battery is made.

A battery 1, such as a lithium battery, will be described with reference to FIG. 4. The battery (lithium battery) 1 has a battery module 2 consisting of cells (storage cells) 3, leads 4 connected to the battery module 2, and a battery case (package) 5 for holding the battery module 2 and the leads 4 therein. A peripheral part (heat-sealed part) 9 of the package 5 is heat-sealed, and the leads 4 project outside from the package 5.

Lead-insulating films 6 are placed between the opposite surfaces of the leads 4, and opposite walls of the peripheral part 9 of the package 5.

Members will be described hereinafter.

the lead (tab) 4 of the lithium battery 1 is an elongate metal plate or bar. The lead 4 having the shape of a plate has a thickness in the range of 50 to 2000 μm and a width in the range of about 2.5 to about 20 mm. The lead 4 is an Al member, a Cu member, Ni-plated Al member or a Ni-plated Cu member. As shown in FIG. 1(a), a heat-sealable layer 14 included in the package 5 of the lithium battery 1 is formed of a resin that enables two heat-sealable layers 14 to be bonded together by heat-sealing. Although it is desirable to form the heat-sealable layer of a resin directly bondable to the lead 4 by heat-sealing, as mentioned above, a single-layer or a multilayer film of a general polyolefin resin, such as a polyethylene resin or a polypropylene resin, or a blended resin is used as the heat-sealable layer 14 of the package 5, and the lead 4 and the heat-sealable layer 14 is hermetically bonded together by the lead-insulating film 6 by heat-sealing (FIGS. 1(a) to 1(d)).

The package 5 of the lithium battery 1 must be capable of maintaining the ability of the battery module 2 for a long period of use. As shown in FIGS. 1(a) to 1(d), the package 5 is formed from a laminated sheet 10 having a base layer 11, a barrier layer 12, a bonding resin layer 13 and a heat-sealable layer 14.

When a heat-sealable layer 14' of a laminated sheet 10 forming a package 5 of a lithium battery 1 was formed of a polyolefin resin or the like, sometimes, a problem arose in a part of the package 5 corresponding to a lead 4' when putting a battery module 2 in the package and sealing the battery module 2 in the package 5 by sealing a peripheral part 9 as shown in FIGS. 9(a) and 9(b). For example, when a lead-insulating film 6' of an acid-modified polyolefin resin is used, sometimes, both the heat-sealable layer 14' and the lead-insulating film 6' melt when heat and pressure is applied thereto for heat-sealing. Sometimes, both a barrier layer 12' serving as an insulating layer on the inner side of a barrier layer 12' of the package 5, and the lead-insulating film 6' were extruded outside a pressed region by pressure. Consequently, an aluminum foil serving as the barrier layer 12' and the lead 4' formed of a metal were connected accidentally to form a joint S. The inventors of the present invention found that such a problem can be solved by using a lead-insulating film formed of proper materials and having proper structure through assiduous studies to prevent such a short circuit, and have made the present invention.

As shown in FIGS. 1(a) and 1(b), the lead-insulating film 6 of the following construction is interposed between the metal lead 4 and the heat-sealable layer 14 of the package 5. The lead-insulating film 6 is capable of being bonded to both the lead 4 and the heat-sealable layer 14 by heat-sealing. To enable the lead-insulating film 6 to maintain an insulating effect under heat and pressure applied thereto for heat-sealing, the lead-bonding film 6 consists of a heat-resistant base film 22, a polyolefin resin layer 21 formed on one of the surfaces of the heat-resistant base film 22 with an anchor coat 24 interposed between the heat-resistant base film 22 and the polyolefin resin layer 21, and an acid-modified polyolefin resin layer 23 formed on the other surface of the heat-resistant base film 22 with another anchor coat 24 interposed between the heat-resistant base film 22 and the acid-modified polyolefin resin layer 23. The polyolefin resin layer 21 and the acid-modified polyolefin resin layer 23 are formed on the base film 22 by an extrusion lamination process. The polyolefin resin layer 21 is on the side of the heat-sealable layer 14, while the acid-modified polyolefin resin layer 23 is on the side of the lead 4. The lead-insulating film 6 of this construction is capable of avoiding accidental contact between the barrier layer 12 of the package 5 and the lead 4.

The acid-modified polyolefin resin layer 23 of the lead-insulating film 6 is formed of a resin that can be bonded to the lead 4 by heating. Possible resins for forming the acid-modified polyolefin resin layer 23 are unsaturated carboxylic acid graft polyolefin resins, metal-crosslinked polyethylene resins, and acid-modified polyethylene resins including copolymers of ethylene or propylene, and acrylic acid or methacrylic acid, and acid-modified polypropylene resins. When necessary, the acid-modified polyolefin resin layer 23 may contain 5% or more butene, an ethylene terpolymer, butene and propylene, a low crystalline ethylene-butene copolymer having a density of 900 kg/m³, an amorphous ethylene-propylene copolymer or a propylene-α-olefin copolymer.

The heat-resistant base film 22 of the lead-insulating film 6 is resistant to heat and is not melted and fluidized under heat-sealing conditions for heat-sealing the peripheral part 9. General heat-sealing conditions include a heating temperature in the range of 180 to 250° C., a heating time in the range of 1 to 10 s, and a sealing pressure in the range of 0.5 to 10 MPa.

More concretely, the heat-resistant base film 22 is an unoriented or oriented film of a polyethylene terephthalate resin (hereinafter referred to as "PET"), a polyethylene naphthalate resin (hereinafter referred to as "PEN"), a polyphenylene sulfide resin (hereinafter referred to as "PPS"), a polymethyl pentene resin (hereinafter referred to as "TPX"), a polyacetal resin (hereinafter referred to as "POM"), a cyclic polyolefin resin or a polypropylene resin. Since the respective melting points of those resins are higher than the melting point in the range of 80 to 160° C. of the polyolefin resin layer and the melting point in the range of 75 to 160° C. of the acid-modified polyolefin resin layer, the base film 22 is able to remain in a film when sealing the battery module 2 in the package 5, and is able to remain in a film between the barrier layer 12 of the package 5, and the lead 4 to function as an insulating layer. Thus, the base film 22 is capable of avoiding formation of the joint S (FIGS. 9(a) and 9(b)) due to contact between the barrier layer 12 and the lead 4 during heat-sealing.

The thickness of the lead-insulating film 6 must be ⅓ or above of the thickness of the lead 4. If the thickness of the lead 4 is 100 μm, the thickness of the lead-insulating film 6 may be 30 μm or above.

The polyolefin resin layer 21 of the lead-insulating film 6 must be capable of being bonded to the heat-sealable layer 14 by heat-sealing and must have a thickness of 5 μm or above. The heat-resistant base film 22 must be insulating and must have a thickness of 3 μm or above. The acid-modified polyolefin resin layer 23 must be capable of being bonded to the lead 4 by heat-sealing and must have a thickness of 10 μm or above.

Generally, the melt-adhesion to a polyolefin resin and an acid-modified polyolefin resin of the heat-resistant base film 2, i.e., the central layer of the lead-insulating film 6, is not satisfactory. The polyolefin resin layer 21 and the acid-modified polyolefin resin layer 23 are formed on the opposite surfaces of the base film 22, respectively, by melt extrusion after producing polar groups, such as —OH groups, —COOH groups or —C=O groups, in the surfaces of the heat-resistant base film 22 by processing the surfaces of the heat-resistant base film 22 by a flame treatment, a corona discharge treatment or a plasma treatment, or after increasing the surface areas of the surfaces of the heat-resistant base film 22 by a surface roughening treatment, such as a blasting treatment, and forming the anchor coats 24 by primer coating using an imine compound, a polyethylene imine compound, an organic titanium compound, an isocyanate compound or a silane compound on the treated surfaces of the heat-resistant base film 22, respectively. It is effective to blow ozone against the surfaces of the heat-resistant base film 22 when forming the polyolefin resin layer 21 and the acid-modified polyolefin resin layer 23 by melt extrusion.

The package 5 of the lithium battery 1 is a pouch as shown in FIG. 4 or an embossed package as shown in FIGS. 5(a) to 5(c). The pouch may be a pillow-type pouch, a three-sided seal pouch or a four-sided seal pouch. FIG. 4 shows a pillow-type pouch 5.

As shown in FIG. 5(a), an embossed package 5 has a case body 5a (FIG. 5(e)) having a hollow part 7 and side walls 8, a cover 5t and a flange 9. As shown in FIG. 5(b), a package 5 may be formed by putting two case bodies 5a together, and bonding together the four sides of the flanges 9 of the case bodies 5a by heat-sealing. A package 5 may be formed by folding an embossed sheet having two case bodies 5a and a middle connecting part 5b connecting the case bodies 5a along the middle connecting part 5b so that the case bodies 5a are put together, and bonding the three sides of the flanges 9 by heat-sealing. Battery modules 2 are sealed in the packages 5 shown in FIGS. 5(a) to 5(c), and leads 4 project outside from the packages 5, respectively (FIGS. 5(d) and 5(e)).

As mentioned above, the lead-insulating films 6 are interposed between the package and the leads 4 if the heat-sealable layers 14 of the package 5 are formed of a material that cannot be bonded to a metal by heat-sealing. As shown in FIGS. 2(a) and 2(b), the lead-insulating films 6 are put on the opposite surfaces of the leads 4 connected to the battery module 2, respectively, or are bonded temporarily to the leads 4, the battery module 2 is put in the package 5, and the flanges 9 of the package 5 holding the leads 4 between them are heat-sealed.

The lead-insulating films 6 may be wound around predetermined parts of the leads 4, respectively, as shown in FIGS. 2(d) and 2(e) instead of putting the same on the opposite surfaces of the leads 4.

Figure 3:
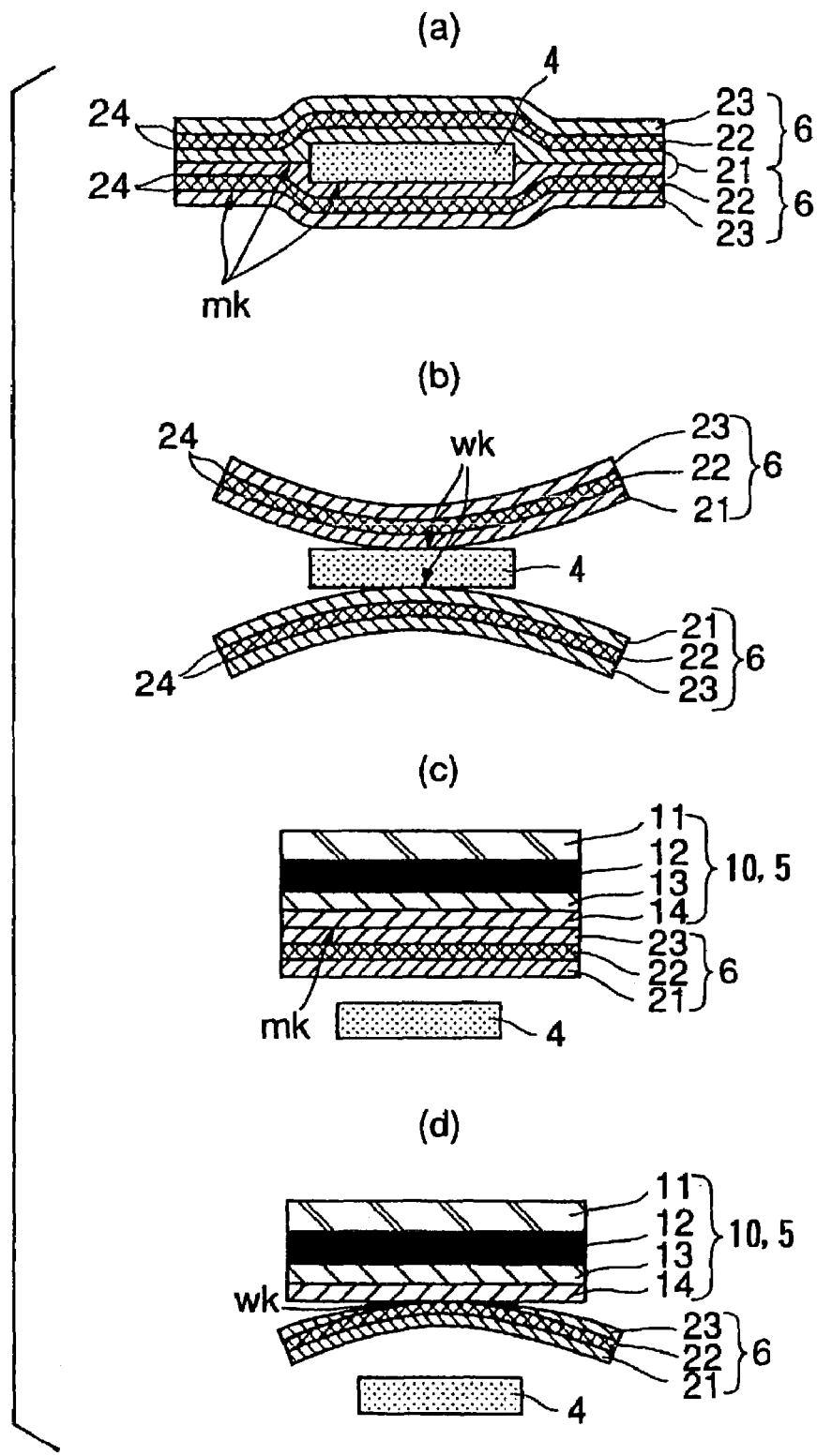
FIG. 3 shows views of leads held between lead-insulating films and a package.

Molten parts mk of the acid-modified polyolefin resin films 21 may be welded to the leads 4 and the opposite lead-insulating films 6 as shown in FIG. 3(a) or parts wk of the lead-insulating films 6 may be bonded temporarily to the leads 4 as shown in FIG. 3(b). A molten part mk of the lead-insulating film 6 may be bonded beforehand to the heat-sealable layer 14 of the package 5 as shown in FIG. 3(c) or a part wk of the lead-insulating film 6 may be bonded to the heat-sealable layer 14 of the package 5 as shown in FIG. 3(d).

When the leads 4 are formed of aluminum, it is desirable to finish the surfaces of the leads 4 by a chemical conversion treatment to prevent the dissolution and corrosion of the surfaces of the aluminum leads 4 by hydrogen fluoride produced by the interaction of the electrolyte of the lithium battery and moisture. Concretely, the chemical conversion treatment is a process of forming an acid-resistant film by using an acid-resistant film forming material, such as a phosphate, a chromate, a fluoride or a triazine thiol compound. A phosphoric acid chromate treatment using a mixture of a phenolic resin, a chromium fluoride (3) compound and phosphoric acid has satisfactory effect. It is more preferable to use a material prepared by adding a metal, such as molybdenum, titanium or zirconium, or a metal salt to a resin containing at least a phenolic resin When the lead-insulating films 6 are placed between the package 5 and the leads 4 and the package 5 is sealed, the heat-resistant base films 22 of the lead-insulating films 6 remain between the barrier layers 12 of the package 5 and the leads 4 in the heat-sealed peripheral part 9 as shown in FIG. 1(d), and serve as insulating layers for preventing accidental contact between the barrier layers 12 and the leads 4.

When the battery module 2 is put in the package 5, and the package 5 is sealed with the lead-insulating films 6 interposed between the package 5 and the leads 4, the heat-resistant base films 22 remains between the leads 4 and parts of the barrier layers 12 of the package 5 corresponding to the leads 4 as shown in FIG. 1(d). Thus, accidental contact can be avoided because the heat-resistant films 22 withstand heat and pressure applied thereto during heat-sealing and insulate the leads 4 from the barrier layers 12 of the package 5.

The package 5 for containing the battery module 2 will be described hereinafter.

The package 5 is formed from a laminated sheet 10 as shown in FIG. 7(a). The laminated sheet 10 may have at least abase layer 11, a bonding layer 16, a first chemically converted layer 15a, a barrier layer 12, i.e., an aluminum foil, a second chemically converted layer 15b, a bonding resin layer 13 and a heat-sealable layer 14. The package 5 may be formed from a laminated sheet 10 having at least a base layer 11, a bonding layer 16, a barrier layer 12, a chemically converted layer 15, a bonding resin layer 13 and a heat-sealable layer 14 as shown in FIG. 7(c). The heat-sealable layers 14 may be coated with liquid paraffin layers 19, respectively, as shown in FIGS. 7(b) and 7(d).

FIGS. 8(a) to 8(h) show further laminated sheets 10 for forming the package 5. As shown in FIGS. 8(a) to 8(f), a bonding resin layer 13 may be replaced with a bonding layer 16, and a bonding layer 16 may be replaced with a bonding resin layer 13. As shown in FIGS. 8(e), 8(f) and 8(h), heat-sealable layers 14 may be coated with liquid paraffin layers 19, respectively. As shown in FIGS. 8(g) and 8(h), base layers 11 may be coated with slip coating layers 17, respectively.

The heat-sealable layer 14 is laminated to the second chemically converted layer 15b by a dry lamination process, a sandwich lamination process, a coextrusion lamination process or a thermal lamination process. Parts of laminated sheets 10 shown in FIGS. 8(*a*) to 8(*h*) which are the same as those of the laminated sheets 10 shown in FIGS. 7(*a*) to 7(*d*) are denoted by the same reference characters and the description thereof will be omitted.

Only a surface of the barrier layer 12, i.e., the aluminum foil, on the side of the heat-sealable layer 14 or both the surfaces of the barrier layer 12 on the side of the base layer 11 and on the side of the heat-sealable layer 14, respectively, may be finished by a chemical conversion treatment.

When the laminated sheet 10 is formed by a sandwich lamination process or a coextrusion lamination process, the laminated sheet 10 may be subjected to preheating or post heating to enhance adhesive strength. The liquid paraffin layer 19 improves the formability of the laminated sheet and improves the crack resistance of the heat-sealable layer 14.

The formability of the laminated sheet 10 may be improved by coating at least the surface of the base layer 11 with the slip coating layer 17 of erucamide, oleamide, bisoleamide or the like.

Figure 6:
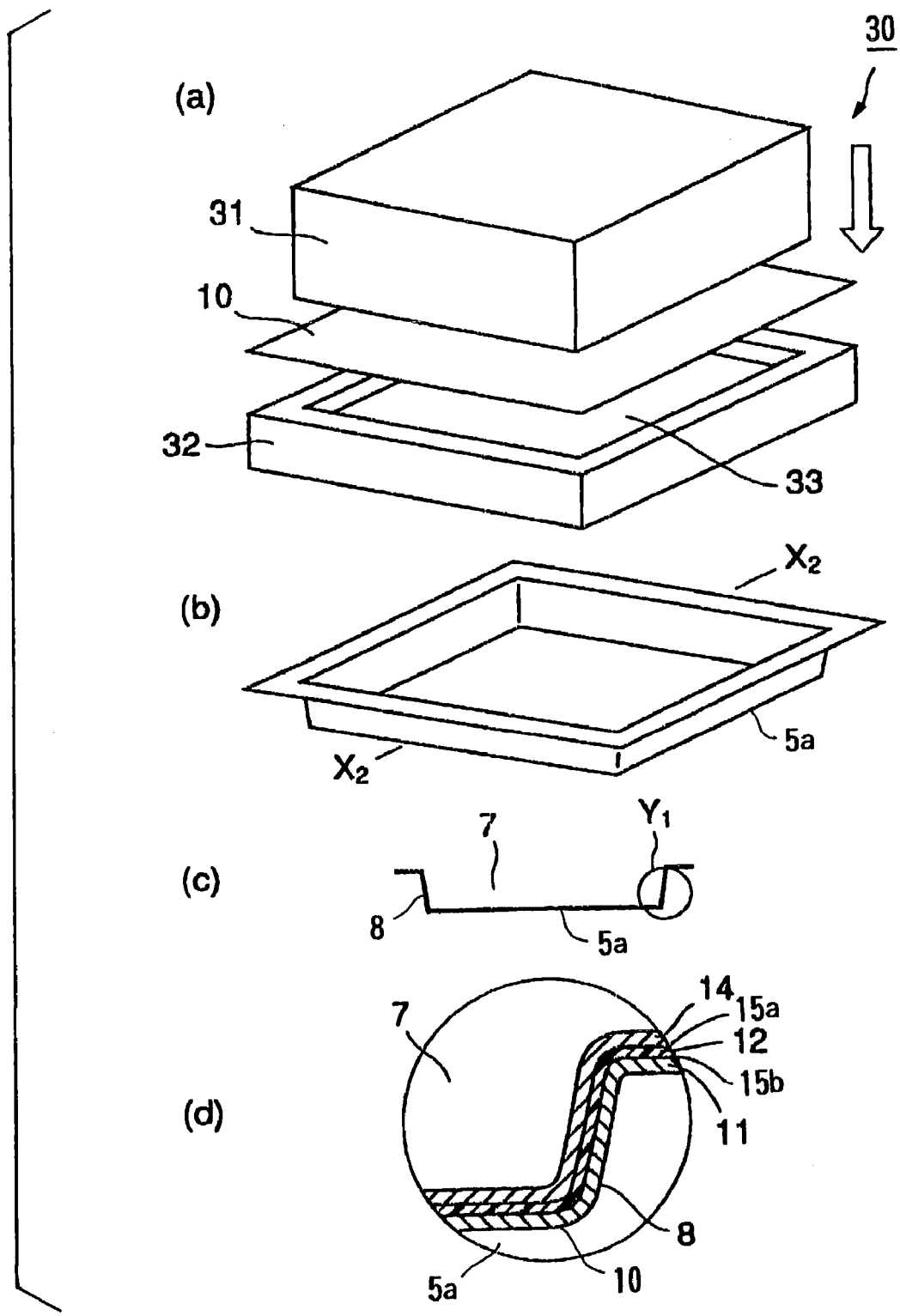
FIG. 6 shows views of assistance in explaining a method of forming an embossed package.

An embossed package 5 is formed by a method illustrated in FIGS. 6(*a*) to 6(*d*). The laminated sheet 10 is subjected to press working on a press provided with a male mold 31 and a female mold 32 to form a case body 5*a* having a hollow part 7 and side walls 8. Sometimes, the case body 5*a* cannot be securely formed if the heat-sealable layer 14 of the laminated sheet 10 does not slip satisfactorily on the male mold 31 of the press. When the heat-sealable layer 14 is coated with the liquid paraffin layer 19, a part of the liquid paraffin layer 14 or the entire liquid paraffin layer 14 permeates the heat-sealable layer 14 of a polypropylene resin or a polyethylene resin, and causes the heat-sealable layer 14 to swell. Consequently, the heat-sealable layer 14 becomes soft and extensible.

The liquid paraffin is a chain hydrocarbon oil having a specific gravity in the range of 0.83 to 0.87, a viscosity in the range of 7.6 to 80 mm$^2$/s at 37.5° C., a molecular weight in the range of about 300 to about 500, and a distillation point under 10 mmHg in the range of 140 to 245° C. A liquid paraffin having a specific gravity of 0.83, a viscosity of 7.7 mm$^2$/s at 37.5° C., a molecular weight of 300, and a distillation point of about 145° C. under 10 mmHg is used preferably in the lithium battery packaging material of the present invention and by a method of making the same lithium battery packaging material.

When the heat-sealable layer 14 is coated with the liquid paraffin layer 19, stress induced in the heat-sealable layer 14 by an embossing process is distributed in the heat-sealable layer 14, so that cracking of the heat-sealable layer 14 of a polyolefin resin that occurs when the laminated sheet 10 is embossed can be reduced or prevented. The liquid paraffin layer 19 exercises a lubricating effect to improve the slip characteristic of the heat-sealable layer 14.

The slip characteristic of the surface of the laminated sheet 10 is improved and the formability of the laminated sheet 10 is improved by forming the slip coating layer 17 on the base layer 11 by applying a solution prepared by mixing a lubricant, such as erucamide, oleamide, stearamide, biserucamide, bisoleamide, bisstearamide or the like, and a solvent, such as isopropyl alcohol, ethyl acetate, toluene, methyl ethyl ketone or the like, to the surface of the base layer 11.

A cover 5*t* is bonded to the case body 5*a* formed by pressing as shown in FIGS. 6(*a*) to 6(*d*) to complete a package 5.

The inventors of the present invention made studies to develop a laminated sheet having a satisfactory emboss-formability, having a base layer 12 and a barrier layer 12 which will not be delaminated, capable of intercepting moisture, and resistant to chemicals. The inventors have found that a satisfactory laminated sheet 10 can be obtained by finishing the opposite surfaces of a barrier layer 12, i.e., aluminum foil, by a chemical conversion treatment, forming a bonding resin layer 13 of an unsaturated carboxylic acid graft polyolefin resin and a heat-sealable layer 14 of a polyolefin resin on the inner surface 15*b* treated by the chemical conversion treatment on the inner side of package formed by using the laminated sheet 10 by a sandwich lamination process or a coextrusion process, and heating the laminated sheet 10.

The base layer 11 of the package 5 is an oriented polyester or nylon film. Possible polyester resins for forming the polyester film are polyethylene terephthalate resins, polybutylene terephthalate resins, polyethylene naphthalate resins, polybutylene naphthalate resins, polyester interpolymers, polycarbonate resins and the like. Possible polyimide resins for forming the nylon film are nylon 6, nylon 66, copolymers of nylon 6 and nylon 66, nylon 610, polymethaxylilene adipamide (MXD6) and the like.

When the laminated sheet 10 is used for forming the package 5 of the lithium battery, the base layer 11 comes into direct contact with hardware. Therefore, it is preferable that the base layer 11 is basically insulating. When the polymer battery is used on a piece of hardware, the base layer 21 comes into direct contact with the piece of hardware. Therefore, it is basically desirable to form the base layer 21 of an intrinsically insulating resin. Since a film forming the base layer 11 has pinholes and pinholes will be formed in the film during processing, the thickness of the base layer 11 must be 6 $\mu$m or above, preferably, in the range of 12 to 30 $\mu$m.

The base layer 11 may be a laminated film in view of providing the base layer 11 with pinhole resistance and improved insulating ability.

A laminated film for the base layer 11 includes at least one resin layer consisting of two or more layers each having a thickness of 6 $\mu$m or above, preferably, in the range of 12 to 25 $\mu$m. The following laminated structures 1) to 8) are examples of the laminated base layer 21.

1) Oriented polyethylene terephthalate resin layer/Oriented nylon layer

2) Oriented nylon layer/Oriented polyethylene terephthalate resin layer

To improve the mechanical aptitude (stability when passed through processing machines and a packaging machine) and surface protecting ability (heat resistance and electrolyte resistance) of the packaging sheet 10 and to reduce friction between a die and the base layer 11 when embossing the laminated sheet 10, it is preferable that the base layer consists of plural layers and the surface of the base layer is coated with a slip coating layer 17 of a fluorocarbon resin, an acrylic resin, a silicone resin, a polyester resin or a blend of some of those resins. The followings are combinations of a base layer 11 and a slip coating layer 17.

3) Fluorocarbon resin layer/Oriented polyethylene terephthalate resin layer(The fluorocarbon resin layer may be a fluorocarbon resin film or a film formed by spreading a liquid fluorocarbon resin in a film and drying the same.)

4) Silicone resin layer/Oriented polyethylene terephthalate resin layer (The silicone resin layer may be a silicone resin film or a film formed by spreading a liquid silicone resin in a film and drying the same.)

5) Fluorocarbon resin layer/Oriented polyethylene terephthalate resin layer/Oriented nylon layer 6) Silicone resin layer/Oriented polyethylene terephthalate resin layer/Oriented nylon layer 7) Acrylic resin layer/Oriented nylon layer (The acrylic resin layer may be an acrylic resin film or a film formed by spreading an acrylic resin and drying the same.)

8) Acrylic resin+polysiloxane graft acrylic resin layer/Oriented nylon layer (The acrylic resin layer may be a film of an acrylic resin or a film formed by spreading an acrylic resin and drying the same.)

The barrier layer 12 prevents the penetration of moisture into the lithium battery. To stabilize the workability (ease of fabricating pouches or embossing) and to provide the barrier layer 12 with pinhole resistance, the barrier layer 12 has a thickness of 15 $\mu$m or above and is formed from a metal foil, such as an aluminum foil or a nickel foil, or a film coated with an inorganic compound, such as silicon dioxide or alumina, by evaporation. Preferably, the barrier layer 12 is an aluminum foil of a thickness in the range of 20 to 80 $\mu$m.

To prevent the creation of pinholes and cracks in an embossed package, aluminum having an iron content in the range of 0.3 to 9.0% by weight, preferably, 0.7 to 2.0% by weight, is used for forming the barrier layer 12. Aluminum having such an iron content is more satisfactory in ductility than aluminum not containing any iron, the barrier layer 12 of aluminum having such an iron content is not likely to have pinholes when the laminated sheet 10 is bent and is more capable of facilitating forming the sidewalls 8 of the embossed package 5 than a barrier layer of aluminum not containing any iron. A barrier layer of aluminum having an iron content less than 0.3% by weight is not satisfactorily pinhole-resistant and do not improve the formability of the laminated sheet. A barrier layer of aluminum having an iron content exceeding 0.9% by weight is unsatisfactory in flexibility and affects adversely the workability of the laminated sheet in forming a pouch.

The flexibility, stiffness and hardness of an aluminum foil formed by cold rolling are dependent on annealing conditions. The present invention uses rather soft, slightly or completely annealed aluminum foils.

Annealing conditions that affect the flexibility, stiffness and hardness of aluminum foils may be properly determined according to the required workability (ease of forming pouches or embossed packages) of the laminated sheet. For example, to prevent the formation of creases or pinholes in making a package by an embossing process, it is desirable to use a soft aluminum foil properly annealed according to the degree of forming.

The inventors of the present invention found through studies that a satisfactory laminated sheet 10 as a lithium battery packaging material can be formed by using an aluminum foil having opposite surfaces coated with chemically converted coatings 15a and 15b formed by a chemical conversion treatment as the barrier layer 12. The chemical conversion treatment forms the chemically converted coatings 15a and 15b, i.e., acid-resistant films, of a phosphate, a chromate, a fluoride or a triazine thiol compound. Thus the separation of the barrier layer 12 from the base layer 11 during an embossing process can be prevented, and the dissolution and corrosion of the surfaces of the barrier layer 12 of aluminum by hydrogen fluoride produced by the interaction of the electrolyte of the lithium battery 1 and moisture can be prevented. Particularly, the dissolution and corrosion of aluminum oxide layers coating the surfaces of the aluminum foil can be prevented, the adhesive property (wettability) of the surfaces of the aluminum foil can be improved, the separation of the barrier layer 12 of aluminum from the base layer 11 can be prevented and the separation of the barrier layer 12 of aluminum and the inner layer due to the effect of hydrogen fluoride produced by the interaction of the electrolyte and moisture can be prevented by the chemical conversion treatment of the barrier layer 12 of aluminum.

It was found through experimental chemical conversion treatment using various substances that a chemical conversion treatment method using a mixture of a phenolic resin, a chromium fluoride (3) compound and phosphoric acid has satisfactory effect.

Preferably, the chemical conversion treatment uses a processing material prepared by adding a metal, such as molybdenum, titanium or zirconium, or a metal salt to a resin containing at least a phenolic resin.

When the package 5 of the lithium battery 1 is an embossed package, the delamination of the barrier layer 12 of aluminum and the base layer 11 during an embossing process can be prevented by finishing both the surfaces of the barrier layer 12 of aluminum by a chemical conversion treatment.

The inventors have found through assiduous studies to establish a laminating method capable of bonding component layers of a laminated sheet by high bond strength that, when fabricating a laminated sheet 10 by bonding a base layer 11 to one of the chemically converted surfaces of a barrier layer 12 by dry lamination, and extruding a bonding resin layer 13 of an acid-modified polyolefin resin on the other surface of the barrier layer 12 and laminating a heat-sealable layer 14, such as a polyethylene or polypropylene film to the barrier layer 12 by sandwich lamination, or when fabricating a laminated sheet 10 by laminating a bonding resin layer 13 of an acid-modified polyethylene resin and a heat-sealable layer 14 of a polyethylene resin of a polypropylene resin by coextrusion, the component layers of the laminated sheet 10 can be bonded together by desired bond strength by heating the laminated sheet 10 such that the acid-modified polyolefin resin is heated at temperatures not lower than its softening point.

The laminated sheet 10 may be heated by any suitable heating method, such as a heated roller contact heating method, heated air heating method or a far infrared heating method, provided that the bonding resin layer can be heated at temperatures not lower than its softening point.

Another method of fabricating a laminated sheet 10 consisting of layers bonded together by stable bonding strength is to heat a surface of a barrier layer 12 of aluminum on the side of a heat-sealable layer 14 at a temperature corresponding to the softening point of an acid-modified polyolefin resin during a sandwich lamination process or a coextrusion lamination process.

The bonding resin layer 13 may be formed of a polyethylene resin. When the bonding resin layer 13 is formed of a polyethylene resin, a surface of a molten polyethylene resin film on the side of the barrier layer 12 of aluminum is processed by ozone before laminating the molten polyethylene resin film to the barrier layer 12.

The component layers 21, 22 and 23 of the lead-insulating film 6 may be processed by a surface activating treatment, such as a corona discharge treatment, a blasting treatment, an oxidation treatment or an ozone treatment, to improve and stabilize aptitudes for film formation, lamination and fabrication (pouch formation and embossing).

The heat-sealable layer 14 of the package 5 may be a single-ply layer or a multi-ply layer of one or a blend of some of propylene resins (homo polymers or ethylene-propylene copolymers and ethylene-propylene-butene terpolymers), ethylene resins (low-density polyethylene resins, middle-density polyethylene resins, high-density polyethylene resins, linear low-density polyethylene resins, ethylene-butene copolymers, copolymers of ethylene, and acrylic acid or a methacrylic acid derivative, ethylene-vinyl acetate copolymers, and graft polyethylene or polypropylene resins of a metal-ion-containing polyethylene resin and unsaturated carboxylic acid.

The material of the heat-sealable layer 14 or the bonding resin layer 13 may contain butene, an ethylene-butene-propylene terpolymers, a low crystalline ethylene-butene copolymer having a density of 900 kg/m$^3$, an amorphous ethylene-propylene copolymer, or a propylene-α-olefin copolymer.

A dry lamination process, a sandwich lamination process, a coextrusion lamination process and thermal lamination process may be used for forming the laminated sheet 10 for forming the package 5.

EXAMPLES

Examples of the lead-insulating film 6 will be described
When processing barrier layers 12 of packages 5 in both examples and comparative examples by a chemical conversion treatment, an aqueous solution containing a phenolic resin, a chromium fluoride (3) compound and phosphoric acid was used as a processing liquid. The processing liquid was applied in a film to the barrier layer 12 by a roll coating method, and the film of the processing liquid was baked at 180° C. or above. The chromium content of the film was 2 mg/M$^2$ (dry spread).

In the examples and comparative examples, pouches 5 were 30 mm wide and 50 mm long (inside measurements), and embossed packages 5 were single-hollow embossed packages having a hollow part of 30 mm in width, 50 mm in length and 3.5 mm in depth. Laminated sheets were pressed for formability evaluation.

Example 1

Pouch

Both the surfaces of a 20 μm thick aluminum foil (barrier layer 12) were processed by the chemical conversion treatment. A 12 μm thick oriented polyester film (base layer 11) was laminated to one of the surfaces of the aluminum foil by a dry lamination process. The other chemically converted surface of the aluminum foil was heated at a temperature not lower than the softening point of an acid-modified polyethylene resin (unsaturated carboxylic acid graft polyethylene resin), i.e., a bonding resin, with infrared radiation and hot air, and a 20 μm thick bonding resin layer 13 of the acid-modified polyethylene resin (unsaturated carboxylic acid graft polyethylene resin), and a 30 μm thick linear low-density polyethylene resin film as a heat-sealable layer 14 were laminated to the barrier layer 12 by a sandwich lamination process to obtain a laminated sheet 10. Pillow-type pouches were made from the laminated sheet 10.

A lead-insulating film 6 was made by laminating a 50 μm thick ethylene-methacrylic acid copolymer film (EMAA film) to one surface of a 12 μm thick PET film (biaxially oriented polyester film) (base film 22) after coating the same surface with an isocyanate anchor coating, by an extrusion lamination process, and laminating a 50 μm thick EMAA film to the other surface of the PET film after coating the same surface with an isocyanate anchor coating.

The lead-insulating films 6 were bonded temporarily to the upper and the lower surface of a 100 μm thick, 4 mm wide lead 4 of aluminum, the lead was inserted in the pouch 5, and the pouch 5 was heat-sealed under heat-sealing conditions including a heating temperature of 190° C., a pressure of 1.0 MPa and a heating time of 3.0 s to obtain a test sample in Example 1.

Example 2

Pouch

Both the surfaces of a 20 μm thick aluminum foil were processed by the chemical conversion treatment. A 12 μm thick oriented polyester film was laminated to one of the surfaces of the aluminum foil by a dry lamination process. The other chemically converted surface of the aluminum foil was heated at a temperature not lower than the softening point of an acid-modified polypropylene resin, i.e., a bonding resin, with infrared radiation and hot air, and a 20 μm thick bonding resin layer of the acid-modified polypropylene resin (unsaturated carboxylic acid graft polyethylene resin), and a 30 μm thick linear low-density polyethylene resin film as a heat-sealable layer were laminated to the barrier layer by a sandwich lamination process to obtain a laminated sheet 10. Pillow-type pouches were made from the laminated sheet 10.

A lead-insulating film 6 was made by laminating a 20 μm thick polypropylene resin film to one surface of a 12 μm thick PEN film (biaxially oriented polyethylene naphthalate film) by an extrusion lamination process after coating the same surface with an imine anchor coating, and laminating a 10 μm thick acid-modified polypropylene resin film to the other surface of the PET film after coating the same surface with an imine anchor coating.

The lead-insulating films 6 were bonded temporarily to the upper and the lower surface of a 100 μm thick, 4 mm wide lead 4 of aluminum such that the acid-modified polypropylene resin layers face the lead, the lead was inserted in the pouch, and the pouch was heat-sealed under heat-sealing conditions including a heating temperature of 190° C., a pressure of 1.0 MPa and a heating time of 3.0 s to obtain a test sample in Example 2.

Example 3

Pouch

One of the surfaces of a 20 μm thick aluminum foil was processed by the chemical conversion treatment. A 12 μm thick oriented polyester film was laminated to the other surface not processed by the chemical conversion treatment of the aluminum foil a dry lamination process. The chemically converted surface of the aluminum foil was heated at a temperature not lower than the softening point of an acid-modified polypropylene resin (unsaturated carboxylic acid graft polyethylene resin) with infrared radiation and hot air, and a 20 μm thick bonding resin layer of the acid-modified polyethylene resin, and a 100 μm thick linear low-density polyethylene resin film as a heat-sealable layer were laminated to the barrier layer by a sandwich lamination process to obtain a laminated sheet 10. Pillow-type pouches were made from the laminated sheet 10.

A lead-insulating film 6 was made by laminating a 20 μm thick ethylene-acrylic acid copolymer film (EAA film) to one surface of a 6 μm thick PPS film (polyphenylene sulfide film) by an extrusion lamination process after coating the same surface with an organic titanium anchor coating, and laminating a 40 μm thick acid-modified polypropylene resin film (EAA) to the other surface of the PPS film after coating the same surface with an organic titanium anchor coating.

The lead-insulating films 6 were bonded temporarily to the upper and the lower surface of a 100 μm thick, 10 mm wide lead 4 of aluminum, and the pouch was heat-sealed under heat-sealing conditions including a heating temperature of 190° C., a pressure of 2.0 MPa and a heating time of 3.0 s to obtain a test sample in Example 3

Example 4

Embossed Package

Both the surfaces of a 40 μm thick aluminum foil were processed by the chemical conversion treatment. A 25 μm thick oriented nylon film was laminated to one of the surfaces of the aluminum foil by a dry lamination process. Then, a primary laminated sheet was formed by laminating a 30 μm thick linear low-density polyethylene resin film having a density of 0.921 to the other chemically converted surface of the aluminum foil by using a 20 μm thick acid-modified polyethylene resin film (unsaturated carboxylic acid graft polyethylene) as a bonding layer by a sandwich lamination process. The primary laminated sheet was heated at a temperature not lower than the softening point of the acid-modified polyethylene resin with hot air to obtain a secondary laminated sheet. Embossed case bodies were formed by embossing the secondary laminated sheet, and covers were formed by cutting the secondary laminated sheet.

A lead-insulating film 6 was made by laminating a 20 μm thick linear low-density polyethylene resin film to one surface of an 50 μm thick TPX film (polymethyl pentene resin film) by an extrusion lamination process after coating the same surface with an imine anchor coating, and laminating a 100 μm thick acid-modified polyethylene resin film (unsaturated carboxylic acid graft polyethylene resin film) to the other surface of the TPX film after coating the same surface with an isocyanate anchor coating.

The lead-insulating films were welded to the upper and the lower surface of a 200 μm thick, 10 mm wide lead of aluminum such that the unsaturated carboxylic acid graft polyethylene resin films face the lead, the lead was inserted in the embossed package, and the embossed package was heat-sealed under heat-sealing conditions including a heating temperature of 190° C., a pressure of 1.0 MPa and a heating time of 5.0 s to obtain a test sample in Example 4.

Example 5

Embossed Package

Both the surfaces of a 40 μm thick aluminum foil were processed by the chemical conversion treatment. A 25 μm thick oriented nylon film was laminated to one of the surfaces of the aluminum foil by a dry lamination process. Then, a primary laminated sheet was formed by laminating a 30 tm thick propylene resin film having a density of 0.921 to the other chemically converted surface of the aluminum foil by using a 15 tm thick acid-modified polypropylene resin film (unsaturated carboxylic acid graft polypropylene film) as a bonding layer by a sandwich lamination process. The primary laminated sheet was heated at a temperature not lower than the softening point of an acid-modified polyethylene resin with hot air to obtain a secondary laminated sheet. Embossed case bodies were formed by embossing the secondary laminated sheet, and covers were formed by cutting the secondary laminated sheet.

A lead-insulating film 6 was made by laminating a 20 μm thick polypropylene resin film to one surface of an 80 μm thick POM film (polyacetal resin film) by an extrusion lamination process after coating the same surface with an isocyanate anchor coating, and laminating a 50 μm thick acid-modified polypropylene resin film (unsaturated carboxylic acid graft polypropylene resin film) to the other surface of the POM film by an extrusion lamination process after coating the same surface with an isocyanate anchor coating.

The lead-insulating films 6 were welded to the upper and the lower surface of a 100 μm thick, 6.0 mm wide lead of aluminum such that the unsaturated carboxylic acid graft polypropylene resin films face the lead, the lead was inserted in the embossed package, and the embossed package was heat-sealed under heat-sealing conditions including a heating temperature of 190° C., a pressure of 2.0 MPa and a heating time of 10 s to obtain a test sample in Example 5.

Example 6

Embossed Package

Both the surfaces of a 40 μm thick aluminum foil were processed by the chemical conversion treatment. A 25 μm thick oriented nylon film was laminated to one of the surfaces of the aluminum foil by a dry lamination process. Then, a 30 μm thick linear low-density polyethylene resin film having a density of 0.921 was laminated to the other chemically converted surface of the aluminum foil by a dry lamination process to obtain a laminated sheet. Embossed case bodies were formed by embossing the laminated sheet, and covers were formed by cutting the laminated sheet.

A lead-insulating film 6 was made by laminating a 20 μm thick linear low-density polyethylene resin film to one surface of a 40 μm thick cyclic polyolefin rein film by an extrusion lamination process after coating the same surface with a polyethylene imine anchor coating, and laminating a 50 μm thick acid-modified polyethylene resin film (unsaturated carboxylic acid graft polyethylene resin film) to the other surface of the cyclic polyolefin resin film by an extrusion lamination process after coating the same surface with a polyethylene imine anchor coating.

The lead-insulating films were welded to the upper and the lower surface of a 100 μm thick, 4 mm wide lead of aluminum such that the ethylene-methacrylic acid copolymer films face the lead, the lead was inserted in the embossed package, and the embossed package was heat-sealed under heat-sealing conditions including a heating temperature of 190° C., a pressure of 1.0 MPa and a heating time of 5.0 s to obtain a test sample in Example 6.

Example 7

Pouch

Both the surfaces of a 20 μm thick aluminum foil were processed by the chemical conversion treatment. A 12 μm thick oriented polyester film was laminated to one of the surfaces of the aluminum foil by a dry lamination process. Then, the other surface of the chemically converted surface of the aluminum foil was heated at a temperature not lower than the softening point of an acid-modified polyethylene resin (unsaturated carboxylic acid graft polyethylene resin) i.e., a bonding resin, with infrared radiation and hot air, and a 30 μm thick linear low-density polyethylene resin film, i.e., a heat-sealable layer, was laminated to the other chemically converted surface of the aluminum foil with a 20 μm thick acid-modified polyethylene resin film by a sandwich lamination process to obtain a laminated sheet. Pillow type pouches were made from the laminated sheet.

A lead-insulating film 6 was made by laminating a 60 μm thick ethylene-methacrylic acid copolymer film (EMAA FILM) to one surface of a 30 μm thick biaxially oriented polypropylene resin film (OPP film) by an extrusion lamination process after coating the same surface with an isocyanate anchor coating, and laminating a 60 μm thick EMAA film to the other surface of the EMAA film by an extrusion lamination process after coating the same surface with am isocyanate anchor coating.

The lead-insulating films were welded to the upper and the lower surface of a 100 μm thick, 4 mm wide lead of aluminum such that the acid-modified polyethylene resin layers face the lead, the lead was inserted in the pouch, and the pouch was heat-sealed under heat-sealing conditions including a heating temperature of 190° C., a pressure of 1.0 MPa and a heating time of 3.0 s to obtain a test sample in Example 7.

Comparative Example 1

Pouch

Both the surfaces of a 20 μm thick aluminum foil were processed by a chemical conversion treatment. A 12 μm thick oriented polyester film was laminated to one of the surfaces of the aluminum foil by a dry lamination process. The other chemically converted surface of the aluminum foil was heated at a temperature not lower than the softening point of an acid-modified polyethylene resin, i.e., a bonding resin, with infrared radiation and hot air, and a 20 μm thick acid-modified polyethylene resin film (unsaturated carboxylic acid graft polyethylene resin film), and a 30 μm thick linear low-density polyethylene resin film as a heat-sealable layer were laminated to the aluminum foil by a sandwich lamination process to obtain a laminated sheet. Pillow-type pouches were made from the laminated sheet.

A 50 μm thick acid-modified polyethylene resin film (unsaturated carboxylic acid graft polyethylene resin film) was used as a lead-insulating film.

The lead-insulating films were bonded temporarily to the upper and the lower surface of a 100 μm thick, 4 mm wide lead of aluminum, the lead was inserted in the pouch, and the pouch was heat-sealed under heat-sealing conditions including a heating temperature of 190° C., a pressure of 1.0 MPa and a heating time of 2.5 s to obtain a test sample in Comparative example 1.

Comparative Example 2

Pouch

Both the surfaces of a 20 μm thick aluminum foil were processed by a chemical conversion treatment. A 12 μm thick oriented polyester film was laminated to one of the surfaces of the aluminum foil by a dry lamination process. The other chemically converted surface of the aluminum foil was heated at a temperature not lower than the softening point of an acid-modified polypropylene resin, i.e., a bonding resin, with infrared radiation and hot air, and a 20 μm thick acid-modified polypropylene resin film (unsaturated carboxylic acid graft polypropylene resin film) as a bonding resin layer, and a 100 μm thick polypropylene resin film as a heat-sealable layer were laminated to the aluminum foil by a sandwich lamination process to obtain a laminated sheet. Pillow-type pouches were made from the laminated sheet.

A 200 μm thick polypropylene-base acid-modified polypropylene resin film (unsaturated carboxylic acid graft polypropylene resin film) was used as a lead-insulating film.

The lead-insulating films were bonded temporarily to the upper and the lower surface of a 100 μm thick, 4 mm wide lead of aluminum, the lead was inserted in the pouch, and the pouch was heat-sealed under heat-sealing conditions including a heating temperature of 190° C., a pressure of 2.0 MPa and a heating time of 3.0 s to obtain a test sample in Comparative example 2.

Comparative Example 3

Embossed Package

Both the surfaces of a 40 μm thick aluminum foil were processed by a chemical conversion treatment. A 25 μm thick oriented nylon film was laminated to one of the surfaces of the aluminum foil by a dry lamination process. A 20 μm thick acid-modified polyethylene resin film (unsaturated carboxylic acid graft polyethylene resin film) as a bonding resin layer, and a 30 μm thick linear low-density polyethylene resin film having a density of 0.921 were laminated to the other chemically converted surface of the aluminum foil by a sandwich lamination process to obtain a primary laminated sheet. The primary laminated sheet was heated at a temperature not lower than the softening point of the acid-modified polyethylene resin. Embossed case bodies were formed by embossing the primary laminated sheet, and covers were formed by cutting the primary laminated sheet.

A 200 μm thick acid-modified polyethylene resin film (unsaturated carboxylic acid graft polyethylene resin film) was used as a lead-insulating film.

The lead-insulating films were bonded temporarily to the upper and the lower surface of a 200 μm thick, 4 mm wide lead of aluminum, the lead was inserted in the embossed package, and the embossed package was heat-sealed under heat-sealing conditions including a heating temperature of 190° C., a pressure of 1.0 MPa and a heating time of 5 s to obtain a test sample in Comparative example 3.

Comparative Example 4

Embossed Package

Both the surfaces of a 40 μm thick aluminum foil were processed by a chemical conversion treatment. A 25 μm thick oriented nylon film was laminated to one of the surfaces of the aluminum foil by a dry lamination process. A 20 μm thick acid-modified polypropylene resin film (unsaturated carboxylic acid graft polypropylene resin film) as a bonding resin layer, and a 30 μm thick propylene resin film having a density of 0.921 were laminated to the other chemically converted surface of the aluminum foil by a sandwich lamination process to obtain a primary laminated sheet. The primary laminated sheet was heated at a temperature not lower than the softening point of the acid-modified polypropylene resin. Embossed case bodies were formed by embossing the primary laminated sheet, and covers were formed by cutting the primary laminated sheet.

A 100 μm thick acid-modified polypropylene resin film (unsaturated carboxylic acid graft polypropylene resin film) was used as a lead-insulating film.

The lead-insulating films were bonded temporarily to the upper and the lower surface of a 100 μm thick, 4 mm wide lead of aluminum, the lead was inserted in the embossed package, and the embossed package was heat-sealed under heat-sealing conditions including a heating temperature of 190° C., a pressure of 0.2 MPa and a heating time of 10 s to obtain a test sample in Comparative example 4.

Method of Evaluation (1) Contact Between Lead and Barrier Layer

A part of the lead in a heat-sealed part of the package was cut, and a photograph of a section of the lead was observed to examine the condition of the lead relative to the package. A circuit analyzer was used to confirm the condition of the lead relative to the barrier layer of the package when it is difficult to determine visually whether or not the lead was in contact with the barrier layer of the package. It was decided that the lead is barely apart from the barrier layer when any film was not found between the lead and the barrier layer of the package in the photograph. Test samples which were determined through examination using the circuit analyzer that their leads were in contact with the barrier layers were examined.

(2) Leakage

Sample packages were examined for the leakage of an electrolyte 1M $LiPF_6$ contained in the packages through gaps around the lead after keeping the packages in an environment of 80° C. for 24 h. The electrolyte was a 1:1:1 mixture of ethylene carbonate, diethyl carbonate and dimethyl carbonate. Three grams of the electrolyte was contained in each sample package.

Results

Contact between the lead and the barrier layer and the leakage of the electrolyte were not found at all in the test samples in Examples 1 to 7.

The leads of eighty test samples among the one hundred test samples in Comparative example 1 were virtually in contact with the barrier layers, and those of sixty test samples were actually in contact with the barrier layers. Leakage was not found in all the test samples in Comparative example 1.

The leads of fifty test samples among the one hundred test samples in Comparative example 2 were virtually in contact with the barrier layers, and those of forty test samples were actually in contact with the barrier layers. Leakage was not found in all the test samples in Comparative example 2.

The leads of eighty test samples among the one hundred test samples in Comparative example 3 were actually in contact with the barrier layers. Leakage was not found in all the test samples in Comparative example 3.

The leads of sixty test samples among the one hundred test samples in Comparative example 4 were virtually in contact with the barrier layers, and those of forty test samples were actually in contact with the barrier layers. Leakage was not found in all the test samples in Comparative example 4.

Both the test samples in Examples and those in Comparative examples were satisfactory in other test items other than contact between the lead and the barrier layer.

According to the present invention, a battery module is put in a package, a peripheral part of the package is heat-sealed to seal the battery module in the package. Lead-bonding films are interposed between the leads of the battery module and the package. The lead-insulating film is formed by laminating a polyolefin resin layer and an acid-modified polyolefin resin layer laminated to both the surfaces of a heat-resistant base film, respectively, by extrusion lamination processes after coating both the surfaces of the heat-resistant base film with anchor coatings, respectively. The barrier layer of the package does not come into contact with the leads when the package is sealed, and contents of the package do not leak.

The chemical conversion treatment of both the surfaces of the barrier layer of aluminum of the package prevents the delamination of the base layer and the barrier layer of aluminum when the laminated sheet is subjected to embossing and when the package is heat-sealed. The corrosion of the surfaces of the barrier layer of aluminum by hydrogen fluoride produced by the interaction of the electrolyte of the lithium battery and moisture can be prevented. The delamination of the barrier layer of aluminum and the layer on the inner side of the barrier layer can be prevented.

Second Embodiment

Figure 10:
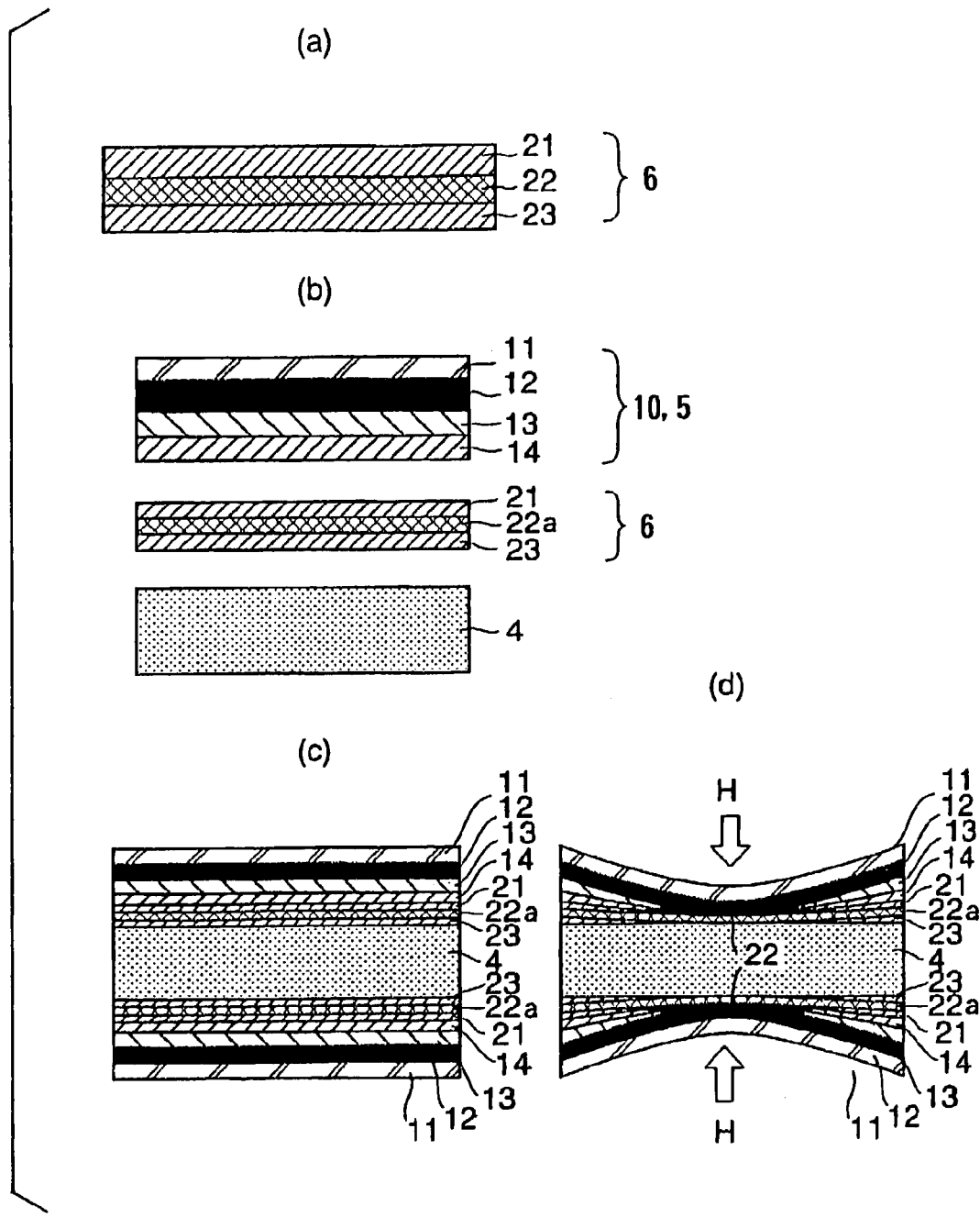
FIG. 10 shows views of assistance in explaining a lead-insulating film in a second embodiment according to the present invention.

A second embodiment of the present invention will be described with reference to FIG. 10. The second embodiment shown in FIG. 10 is substantially the same as the first embodiment shown in FIGS. 1 to 8, except that the second embodiment differs from the first embodiment in the construction of a lead-insulating film 6. In FIG. 10 parts like or corresponding to those shown in FIGS. 1 to 8 are denoted by the same reference characters and the description thereof will be omitted.

Referring to FIGS. 10(*a*) and 10(*b*), a lead-insulating film 6 is interposed between a lead (tab) 4 of a metal and a heat-sealable layer 14 included in a laminated sheet 10 forming a package 5. The lead-insulating film 6 is capable of being bonded to both the lead 4 and the heat-sealable layer 14 by heat-sealing. To enable the lead-insulating film 6 to maintain an insulating effect under heat and pressure applied thereto for heat-sealing, the lead-bonding film 6 is a film consisting of at least a polyolefin resin layer 21, an adhesive polymethyl pentene resin layer 22*a* and an acid-modified polyolefin resin layer 23, and formed by coextrusion.

The polyolefin resin layer 21 of the lead-insulating film (adhesive film) 6 is formed of a polyethylene resin or a polypropylene resin containing ethylene when the heat-sealable layer 14 is formed of a polyethylene resin, or is formed of a polypropylene resin or an ethylene resin containing propylene when the heat-sealable layer 14 of the package 5 is formed of a polypropylene resin.

The acid-modified polyolefin resin layer 23 of the lead-insulating film 6 can be bonded to the lead (tab) 4 by thermal bonding. Possible resins for forming the acid-modified polyolefin resin layer 23 are unsaturated carboxylic acid graft polyolefin resins, metal-crosslinked polyethylene resins, acid-modified polyethylene resins, such as copolymers of ethylene or propylene, and acrylic acid or methacrylic acid, and acid-modified polypropylene resins. When necessary, the acid-modified polyolefin resin layer 23 may contain 5% or more butene, an ethylene terpolymer, butene and propylene, a low crystalline ethylene-butene copolymer having a density of 900 $kg/m^3$, an amorphous ethylene-propylene copolymer or a propylene-α-olefin copolymer.

The lead-insulating film 6 of the present invention is a three-layer film formed by coextrusion. The adhesive polymethyl pentene resin layer (adhesive TPX layer) 22*a* is the middle layer of the lead-insulating film 6. An adhesive TPX resin forming the adhesive polymethyl pentene resin layer 22a is highly adhesive to a polyolefin resin when used for coextrusion in combination with a polyolefin resin, and has a melting point higher than the melting points of polyolefin resins in the range of 80 to 160° C. and the melting points of acid-modified polyolefin resins in the range of 75 to 160° C. Therefore, the adhesive polymethyl pentene resin layer 22a of the adhesive TPX is not crushed by heat and pressure applied thereto during heat-sealing and maintains its function as an insulating layer, while the polyolefin resin layer and the acid-modified polyolefin resin layer are crushed thin.

The TPX resin is prepared by mixing a trimethyl pentene resin having a melting point of 180° C. or above, and 10 to 60% tackfier. Possible tackfiers are terpene resins (terpene phenol resins, aromatic modified resins and hydrogenated resins), rosin derivatives (hydrogenation, disproportionation, dimerization, esterification), cycloaliphatic saturated hydrocarbon resins, limonene resins, alkylphenol resins, xylene resins and coumarone-indene resins.

The lead-insulating film 6 of the present invention is a three-layer film consisting of a polyolefin resin layer 21, an adhesive TPX layer 22a and an acid-modified polyolefin resin layer 23 formed by coextrusion. The weight ratio of those layers 21, 22a and 23 is about (1 to 4):(2 to 8):(1 to 4). The thickness f the adhesive TPX layer 22a must be 10 μm or above. If the thickness of the adhesive TPX layer 22a is less than 10 μm, the insulating effect of the adhesive TPX layer 22a will be lost when heat and pressure is applied thereto for heat-sealing. Desirably, the thickness of the adhesive lead-insulating film 6, i.e., the three-layer coextruded structure, is ⅙ of the thickness of a lead (tab) 4 to which the lead-insulating film 6 is to be attached.

When the package 5 is sealed with the lead-insulating film 6 of the present invention held between the package 5 and the lead 4 to form a heat-sealed part 9, the adhesive TPX layer 22 remains between the barrier layer 12 of the package 5 and the lead 4 in the heat-sealed part 9 as shown in FIG. 1(d), and serves as an insulating layer for isolating the barrier layer 12 from the lead 4.

The lead-insulating film 6 of the present invention has the polyolefin resin layer 21, the adhesive TPX layer 22a and the acid-modified polyolefin resin layer 23. The polyolefin resin layer 21 needs to weld to the heat-sealable layer 14 of the package 5. The polyolefin resin layer 21 of the lead-insulating film 6 is formed of a polyethylene resin when the heat-sealable layer 14 is formed of a polyethylene resin. The polyolefin resin layer 21 of the lead-insulating film 6 is formed of a polypropylene resin when the heat-sealable layer 14 is formed of a polypropylene resin.

Generally, the adhesive TPX layer 22a, i.e., the middle layer, of the lead-insulating film 6 does not weld satisfactorily to a polyolefin resin layer. The weldability of the adhesive TPX layer 22a can be improved by adding 10 to 60% tackifier to the material of the adhesive TPX layer 22a without depriving the adhesive TPX layer 22a of heat resistance.

The acid-denatured polyolefin resin layer 23 of the lead-insulating film 6 welds closely to the lead 4 to prevent the entrance of moisture into the package 5 and the leakage of the component of the battery module 2 contained in the package 5. The acid-modified polyolefin resin layer 23 protects the surface of the lead 4 from the corrosive action of hydrogen fluoride (HF) produced by the interaction of the electrolyte of the battery module 2 and moisture. The acid-modified polyolefin resin layer 23 may be formed of either a polyethylene resin or a polypropylene resin.

When the lead-insulating films 6 are placed between the package 5 and the leads 4 and the package 5 is sealed, the adhesive TPX layers 22a of the lead-insulating films 6 remain between the barrier layers 12 of the package 5 and the leads 4 as shown in FIG. 10(d), and serve as insulating layers for preventing accidental contact between the barrier layers 12 and the leads 4.

The component layers 21, 22 and 23 of the lead-insulating film 6 may be processed by a surface activating treatment, such as a corona discharge treatment, a blasting treatment, an oxidation treatment or an ozone treatment, to improve and stabilize aptitudes for film formation, lamination and fabrication (pouch formation and embossing).

EXAMPLES

Examples of the lead-insulating film 6 will be described.

When processing barrier layers 12 of packages 5 in both examples and comparative examples by a chemical conversion treatment, an aqueous solution containing a phenolic resin, a chromium fluoride (3) compound and phosphoric acid was used as a processing liquid. The processing liquid was applied in a film to the barrier layer 12 by a roll coating method, and the film of the processing liquid was baked at 180° C. or above. The chromium content of the film was 2 mg/m$^2$ (dry weight).

In the examples and comparative examples, pouches 5 were 30 mm wide and 50 mm long (inside measurements), and embossed packages 5 were single-hollow embossed packages having a hollow part of 30 mm in width, 50 mm in length and 3.5 mm in depth. Laminated sheets were pressed for formability evaluation.

Example 1

Pouch

Both the surfaces of a 20 μm thick aluminum foil (barrier layer 12) were processed by the chemical conversion treatment. A 12 μm thick oriented polyester film (base layer 11) was laminated to one of the surfaces of the aluminum foil by a dry lamination process. The other chemically converted surface of the aluminum foil was heated at a temperature not lower than the softening point of an acid-modified polyethylene resin, i.e., a bonding resin, with infrared radiation and hot air, and a 20 μm thick acid-modified polyethylene resin film as a bonding resin layer 13 and a 30 μm thick linear low-density polyethylene resin film as a heat-sealable layer 14 were laminated to the barrier layer 12 by a sandwich lamination process to obtain a laminated sheet 10. Pillow-type pouches were made from the laminated sheet 10.

A lead-insulating film 6 was made. The lead-insulating film 6 was a 30 μm thick laminated film formed by laminating a 10 μm thick linear low-density polyethylene resin layer (polyolefin resin layer 21), a 10 μm thick adhesive TPX layer 22a having a melting point of 190° C., and a 10 μm thick acid-modified polyethylene resin layer of an unsaturated carboxylic acid graft polyethylene resin by a coextrusion process.

The lead-insulating films 6 were bonded temporarily to the upper and the lower surface of a 100 μm thick, 4 mm wide lead 4 of aluminum such that the acid-modified polyethylene resin layers face the lead 4, the lead 4 was inserted in the pouch 5, and the pouch 5 was heat-sealed under heat-sealing conditions including a heating temperature of 190° C., a pressure of 1.0 MPa and a heating time of 3.0 s to obtain a test sample in Example 1.

Example 2

Pouch

One surface of a 20 μm thick aluminum foil to be on the side of the heat-sealable layer was processed by the chemical conversion treatment. A 12 μm thick oriented polyester film was laminated to the other surface not processed by the chemical conversion treatment of the aluminum foil by a dry lamination process. The chemically converted surface of the aluminum foil was heated at a temperature not lower than the softening point of an acid-modified polypropylene resin, i.e., a bonding resin, with infrared radiation and hot air, and a 20 μm thick bonding resin layer of the acid-modified polypropylene resin and a 100 μm thick polypropylene resin film as a heat-sealable layer were laminated to the aluminum foil by a sandwich lamination process to obtain a laminated sheet 10. Pillow-type pouches were made from the laminated sheet 10.

A lead-insulating film 6 was made. The lead-insulating film 6 was a 100 μm thick laminated film formed by laminating a 20 μm thick polypropylene resin layer, a 60 μm thick adhesive TPX layer having a melting point of 200° C., and a 20 μm thick acid-modified polypropylene resin layer of an unsaturated carboxylic acid graft polypropylene resin by a coextrusion process.

The lead-insulating films 6 were bonded temporarily to the upper and the lower surface of a 100 μm thick, 10 mm wide lead 4 of aluminum, the lead was inserted in the pouch, and the pouch was heat-sealed under heat-sealing conditions including a heating temperature of 190° C., a pressure of 2.0 MPa and a heating time of 3.0 s to obtain a test sample in Example 2.

Example 3

Embossed Package

Both the surfaces of a 40 μm thick aluminum foil were processed by the chemical conversion treatment. A 25 μm thick oriented nylon film was laminated to one of the surfaces of the aluminum foil by a dry lamination process. Then, a primary laminated sheet was formed by laminating a 30 μm thick linear low-density polyethylene resin film having a density of 0.921 to the other chemically converted surface of the aluminum foil by using a 20 μm thick acid-modified polyethylene resin film as a bonding layer by a sandwich lamination process. The primary laminated sheet was heated at a temperature not lower than the softening point of the acid-modified polyethylene resin with hot air to obtain a secondary laminated sheet. Embossed case bodies were formed by embossing the secondary laminated sheet, and covers were formed by cutting the secondary laminated sheet.

A lead-insulating film 6 was made. The lead-insulating film 6 was a 40 μm thick laminated film formed by laminating a 10 μm thick linear low-density polyethylene resin film, a 20 μm thick adhesive TPX film, and a 10 μm thick acid-modified polyethylene resin film (unsaturated carboxylic acid graft polyethylene resin film) by a coextrusion process.

The lead-insulating films were welded to the upper and the lower surface of a 200 μm thick, 10 mm wide lead of aluminum such that the unsaturated carboxylic acid graft polyethylene resin films face the lead, the lead was inserted in the embossed package, and the embossed package was heat-sealed under heat-sealing conditions including a heating temperature of 190° C., a pressure of 1.0 MPa and a heating time of 5.0 s to obtain a test sample in Example 3.

Example 4

Embossed Package

Both the surfaces of a 40 μm thick aluminum foil were processed by the chemical conversion treatment. A 25 μm thick oriented nylon film was laminated to one of the surfaces of the aluminum foil by a dry lamination process. Then, a primary laminated sheet was formed by laminating a 30 tm thick propyrene resin film having a density of 0.921 to the other chemically converted surface of the aluminum foil by using a 15 μm thick acid-modified polypropylene resin film as a bonding layer by a sandwich lamination process. The primary laminated sheet was heated at a temperature not lower than the softening point of the acid-modified polyethylene resin with hot air to obtain a secondary laminated sheet. Embossed case bodies were formed by embossing the secondary laminated sheet, and covers were formed by cutting the secondary laminated sheet.

A lead-insulating film was made. The lead-insulating film was a 100 μm thick laminated film formed by laminating a 20 μm thick polypropylene resin film, a 60 μm thick TPX film, and a 20 μm thick unsaturated carboxylic acid graft polypropylene resin film by a coextrusion process.

The lead-insulating films were welded to the upper and the lower surface of a 100 μm thick, 6.0 mm wide lead of aluminum such that the unsaturated carboxylic acid graft polypropylene resin films face the lead, the lead was inserted in the embossed package, and the embossed package was heat-sealed under heat-sealing conditions including a heating temperature of 190° C., a pressure of 2.0 MPa and a heating time of 10 s to obtain a test sample in Example 4.

Example 5

Embossed Package

Both the surfaces of a 40 μm thick aluminum foil were processed by the chemical conversion treatment. A 25 μm thick oriented nylon film was laminated to one of the surfaces of the aluminum foil by a dry lamination process. Then, a 30 μm thick linear low-density polyethylene resin film having a density of 0.921 was laminated to the other chemically converted surface of the aluminum foil by a dry lamination process to obtain a laminated sheet. Embossed case bodies were formed by embossing the laminated sheet, and covers were formed by cutting the laminated sheet.

A lead-insulating film was made. The lead-insulating film was a 50 μm thick laminated film formed by laminating a 10 μm thick medium-density polyethylene resin film, a 30 μm thick adhesive TPX film, and a 10 μm thick ethylene-methacrylic acid copolymer film by a coextrusion process.

The lead-insulating films were welded to the upper and the lower surface of a 100 μm thick, 4 mm wide lead of aluminum such that the ethylene-methacrylic acid copolymer films face the lead, the lead was inserted in the embossed package, and the embossed package was heat-sealed under heat-sealing conditions including a heating temperature of 190° C., a pressure of 1.0 MPa and a heating time of 5.0 s to obtain a test sample in Example 5.

Comparative Example 1

Pouch

Both the surfaces of a 20 μm thick aluminum foil were processed by a chemical conversion treatment. A 12 μm thick oriented polyester film was laminated to one of the surfaces of the aluminum foil by a dry lamination process. The other chemically converted surface of the aluminum foil was heated at a temperature not lower than the softening point of an acid-modified polyethylene resin, i.e., a bonding resin, with infrared radiation and hot air, and a 20 μm thick acid-modified polyethylene resin film and a 30 μm thick linear low-density polyethylene resin film as a heat-sealable layer were laminated to the aluminum foil by a sandwich lamination process to obtain a laminated sheet. Pillow-type pouches were made from the laminated sheet.

A 50 μm thick acid-modified polyethylene resin film (unsaturated carboxylic acid graft polyethylene resin film) was used as a lead-insulating film.

The lead-insulating films were bonded temporarily to the upper and the lower surface of a 100 μm thick, 4 mm wide lead of aluminum, the lead was inserted in the pouch, and the pouch was heat-sealed under heat-sealing conditions including a heating temperature of 190° C., a pressure of 1.0 MPa and a heating time of 2.5 s to obtain a test sample in Comparative example 1.

Comparative Example 2

Pouch

Both the surfaces of a 20 μm thick aluminum foil were processed by a chemical conversion treatment. A 12 μm thick oriented polyester film was laminated to one of the surfaces of the aluminum foil by a dry lamination process. The other chemically converted surface of the aluminum foil was heated at a temperature not lower than the softening point of an acid-modified polypropylene resin, i.e., a bonding resin, with infrared radiation and hot air, and 20 μm thick acid-modified polypropylene resin film (unsaturated carboxylic acid graft polypropylene resin film) as a bonding resin layer and a 100 μm thick polypropylene resin film as a heat-sealable layer were laminated to the aluminum foil by a sandwich lamination process to obtain a laminated sheet. Pillow-type pouches were made from the laminated sheet.

A 200 μm thick polypropylene-base acid-modified polypropylene resin film (unsaturated carboxylic acid graft polypropylene resin film) was used as a lead-insulating film.

The lead-insulating films were bonded temporarily to the upper and the lower surface of a 100 μm thick, 4 mm wide lead of aluminum, the lead was inserted in the pouch, and the pouch was heat-sealed under heat-sealing conditions including a heating temperature of 190° C., a pressure of 2.0 MPa and a heating time of 3.0 s to obtain a test sample in Comparative example 2.

Comparative Example 3

Embossed Package

Both the surfaces of a 40 μm thick aluminum foil were processed by a chemical conversion treatment. A 25 μm thick oriented nylon film was laminated to one of the surfaces of the aluminum foil by a dry lamination process. A 20 μm thick acid-modified polyethylene resin film as a bonding resin layer, and a 30 μm thick linear low-density polyethylene resin film having a density of 0.921 were laminated to the other chemically converted surface of the aluminum foil by a sandwich lamination process to obtain a primary laminated sheet. The primary laminated sheet was heated at a temperature not lower than the softening point of the acid-modified polyethylene resin. Embossed case bodies were formed by embossing the primary laminated sheet, and covers were formed by cutting the primary laminated sheet.

A lead-insulating film was made. The lead-insulating film was a 25 μm thick laminated film formed by laminating a 15 μm thick low-density polyethylene resin film a 5 μm thick adhesive TPX film and a 15 μm thick acid-modified polyethylene resin film (unsaturated carboxylic acid graft polyethylene film) by a coextrusion process.

The lead-insulating films were bonded temporarily to the upper and the lower surface of a 200 μm thick, 4 mm wide lead of aluminum, the lead was inserted in the embossed package, and the embossed package was heat-sealed under heat-sealing conditions including a heating temperature of 190° C., a pressure of 1.0 MPa and a heating time of 5 s to obtain a test sample in Comparative example 3.

Comparative Example 4

Embossed Package

Both the surfaces of a 40 μm thick aluminum foil were processed by a chemical conversion treatment. A 25 μm thick oriented nylon film was laminated to one of the surfaces of the aluminum foil by a dry lamination process. A 20 μm thick acid-modified polypropylene resin film as a bonding resin layer, and a 30 μm thick propylene resin film having a density of 0.921 were laminated to the other chemically converted surface of the aluminum foil by a sandwich lamination process to obtain a primary laminated sheet. The primary laminated sheet was heated at a temperature not lower than the softening point of the acid-modified polyethylene resin. Embossed case bodies were formed by embossing the primary laminated sheet thus heated, and covers were formed by cutting the primary laminated sheet thus heated.

A 100 μm thick acid-modified polypropylene resin film (unsaturated carboxylic acid graft polypropylene resin film) was used as a lead-insulating film.

The lead-insulating films were bonded temporarily to the upper and the lower surface of a 100 μm thick, 4 mm wide lead of aluminum, the lead was inserted in the embossed package, and the embossed package was heat-sealed under heat-sealing conditions including a heating temperature of 190° C., a pressure of 0.2 MPa and a heating time of 10 s to obtain a test sample in Comparative example 4.

Method of Evaluation (1) Contact Between Lead and Barrier Layer

A part of the lead in a heat-sealed part of the package was cut, and a photograph of a section of the lead was observed to examine the condition of the lead relative to the package. A circuit analyzer was used to confirm the condition of the lead relative to the barrier layer of the package when it is difficult to determine visually whether or not the lead was in contact with the barrier layer of the package. It was decided that the lead is barely apart from the barrier layer when any film was not found between the lead and the barrier layer of the package in the photograph. Test samples which were determined through examination using the circuit analyzer that their leads were in contact with the barrier layers were examined.

(2) Leakage

Sample heat-sealed packages were examined for the leakage of an electrolyte 1M $LiPF_6$ contained in the packages through gaps around the lead after keeping the packages in an environment of 80° C. for 24 h. The electrolyte was a 1:1:1 mixture of ethylene carbonate, diethyl carbonate and dimethyl carbonate. Three grams of the electrolyte was contained in each sample package.

Results

Contact between the lead and the barrier layer and the leakage of the electrolyte were not found at all in the test samples in Examples 1 to 5.

The leads of eighty test samples among the one hundred test samples in Comparative example 1 were virtually in contact with the barrier layers, and those of sixty test samples were actually in contact with the barrier layers. Leakage was not found in all the test samples in Comparative example 1.

The leads of fifty test samples among the one hundred test samples in Comparative example 2 were virtually in contact with the barrier layers, and those of forty test samples were actually in contact with the barrier layers. Leakage was not found in all the test samples in Comparative example 2.

The leads of eighty test samples among the one hundred test samples in Comparative example 3 were actually in contact with the barrier layers. Leakage was not found in all the test samples in Comparative example 3.

The leads of sixty test samples among the one hundred test samples in Comparative example 4 were virtually in contact with the barrier layers, and those of forty test samples were actually in contact with the barrier layers. Leakage was not found in all the test samples in Comparative example 4.

Both the test samples in Examples and those in Comparative examples were satisfactory in other test items other than undesirable contact between the lead and the barrier layer.

According to the present invention, a battery module is put in a package, a peripheral part of the package is heat-sealed to seal the battery module in the package. A lead-insulating film is interposed between the leads of the battery module and the package. The lead-insulating film is a film formed by coextrusion and consisting of a polyolefin resin layer, an adhesive polymethyl pentene resin layer and an acid-modified polyolefin resin layer. The barrier layer of the package does not come into contact with the leads when the package is sealed, and contents of the package do not leak.

The chemical conversion treatment of both the surfaces of the barrier layer of aluminum of the package prevents the delamination of the base layer and the barrier layer of aluminum when the laminated sheet is subjected to embossing and when the package is heat-sealed. The corrosion of the surfaces of the barrier layer of aluminum by hydrogen fluoride produced by the interaction of the electrolyte of the lithium battery and moisture can be prevented. The delamination of the barrier layer of aluminum and the layer on the inner side of the barrier layer can be prevented.

What is claimed is:

1. A battery comprising:
    a battery module;
    a battery package for holding the battery module therein; and
    leads extending from the battery module and projecting outside from the battery package;
    wherein (1) the battery package is formed from a laminated sheet, (2) a peripheral part of the package is heat-sealed, (3) and lead-insulating films are interposed between the peripheral part of the package and the leads, and (4) the lead-insulating film is a coextruded filmed formed by coextrusion and consists of polyolefin resin layer on the side of the laminated sheet, an acid-modified polyolefin resin layer on the side of the lead, and an adhesive polymethyl pentene resin layer interposed between the polyolefin resin layer and the acid-modified polyolefin resin layer.

2. The battery according to claim 1, wherein
    the polyolefin resin layer of the coextruded film is formed of a polyethylene resin.

3. The battery according to claim 1, wherein
    the polyolefin resin layer of the coextruded film is formed of a polypropylene resin.

4. The battery according to claim 1, wherein
    the laminated sheet includes, at least a base layer, an aluminum layer and a heat-sealable layer, and
    the heat-sealable layer is formed of a polyolefin resin.

5. A lead-insulating film formed by coextrusion for bonding a lead extending through and projecting outside from a heat-sealed peripheral part of a battery package formed from a laminated sheet to the battery module, said lead-insulating film comprising:
    a polyolefin resin layer on the side of the laminated sheet,
    an acid-modified polyolefin resin film on the side of the lead, and
    an adhesive polymethyl pentene resin layer interposed between the polyolefin resin layer and the acid-modified polyolefin resin layer.

6. The lead-insulating film according to claim 5, wherein
    the polyolefin resin layer is formed of a polyethylene resin.

7. The lead-insulating film according to claim 5, wherein
    the polyolefin resin layer is formed of a polypropylene resin.

* * * * *